US010193680B2

(12) United States Patent
Yoon

(10) Patent No.: US 10,193,680 B2
(45) Date of Patent: *Jan. 29, 2019

(54) APPARATUS AND METHOD FOR ESTIMATING CHANNEL

(71) Applicant: Apple Inc., Cupertino, CA (US)

(72) Inventor: Sungjun Yoon, Seoul (KR)

(73) Assignee: Apple Inc., Cupertino, CA (US)

( * ) Notice: Subject to any disclaimer, the term of this patent is extended or adjusted under 35 U.S.C. 154(b) by 164 days.

This patent is subject to a terminal disclaimer.

(21) Appl. No.: 15/236,835

(22) Filed: Aug. 15, 2016

(65) Prior Publication Data

US 2016/0352489 A1 Dec. 1, 2016

Related U.S. Application Data

(63) Continuation of application No. 13/670,915, filed on Nov. 7, 2012, now Pat. No. 9,419,822.

(30) Foreign Application Priority Data

Nov. 7, 2011 (KR) ........................ 10-2011-0115448

(51) Int. Cl.
*H04L 5/00* (2006.01)
*H04W 76/27* (2018.01)
(Continued)

(52) U.S. Cl.
CPC ........ *H04L 5/0051* (2013.01); *H04L 25/0226* (2013.01); *H04L 27/2613* (2013.01);
(Continued)

(58) Field of Classification Search
None
See application file for complete search history.

(56) References Cited

U.S. PATENT DOCUMENTS 8,588,833 B2 * 11/2013 Khoshnevis ........ H04L 25/0202
370/252
8,724,540 B2    5/2014 Noh et al.
(Continued)

FOREIGN PATENT DOCUMENTS

CN    101931485    12/2010
CN    103493411    1/2014
(Continued)

OTHER PUBLICATIONS

International Search Report dated Mar. 25, 2013 in PCT International Application No. PCT/KR2012/009315.
(Continued)

*Primary Examiner* — Nicholas Sloms
(74) *Attorney, Agent, or Firm* — Meyertons, Hood, Kivlin, Kowert & Goetzel, P.C.

(57) ABSTRACT

A method for transmitting a reference signal includes selecting one of a first initialization value and a second initialization value, generating selection instruction information corresponding to the selected initialization value, transmitting the selection instruction information to a mobile station, generating a reference signal based on the selected initialization value, and transmitting the generated reference signal to the mobile station. A method for estimating a channel includes receiving selection instruction information indicating a selection of at least one of a first initialization value and a second initialization value, receiving a first reference signal based on the selection instruction information, generating a second reference signal based on an initialization value indicated as being selected by the selection instruction information, and estimating a channel state by comparing the first reference signal with the second reference signal.

18 Claims, 8 Drawing Sheets

(51) Int. Cl.
*H04L 27/26* (2006.01)
*H04L 25/02* (2006.01)
*H04W 72/04* (2009.01)
*H04J 11/00* (2006.01)
*H04W 88/02* (2009.01)

(52) U.S. Cl.
CPC ..... *H04W 72/042* (2013.01); *H04W 72/0466* (2013.01); *H04W 76/27* (2018.02); *H04J 11/0053* (2013.01); *H04L 5/0023* (2013.01); *H04L 5/0035* (2013.01); *H04L 5/0048* (2013.01); *H04W 88/02* (2013.01)

(56) References Cited

U.S. PATENT DOCUMENTS

| | | | |
|---|---|---|---|
| 8,730,903 B2 | 5/2014 | Seo et al. | |
| 8,743,791 B2 | 6/2014 | Nam et al. | |
| 9,031,008 B2 | 5/2015 | Nam et al. | |
| 2009/0135803 A1 | 5/2009 | Luo et al. | |
| 2010/0034161 A1 | 2/2010 | Luo et al. | |
| 2010/0195615 A1 | 8/2010 | Lee et al. | |
| 2010/0290389 A1 | 11/2010 | Hou et al. | |
| 2010/0303034 A1 | 12/2010 | Chen et al. | |
| 2010/0322178 A1 | 12/2010 | Li et al. | |
| 2011/0038310 A1* | 2/2011 | Chmiel | H04J 11/0069 370/328 |
| 2011/0085503 A1 | 4/2011 | Nam et al. | |
| 2011/0103250 A1 | 5/2011 | Li et al. | |
| 2011/0103324 A1* | 5/2011 | Nam | H04L 5/0048 370/329 |
| 2011/0103331 A1 | 5/2011 | Kuo | |
| 2011/0249767 A1 | 10/2011 | Chen et al. | |
| 2011/0274197 A1 | 11/2011 | Zhu et al. | |
| 2012/0039282 A1 | 2/2012 | Kim et al. | |
| 2012/0082149 A1 | 4/2012 | Kim et al. | |
| 2012/0269140 A1 | 10/2012 | Nam et al. | |
| 2013/0003663 A1* | 1/2013 | Blankenship | H04L 1/0004 370/329 |
| 2013/0034004 A1 | 2/2013 | Mannemala et al. | |
| 2013/0034064 A1 | 2/2013 | Nam et al. | |
| 2013/0039284 A1* | 2/2013 | Marinier | H04L 5/001 370/329 |
| 2013/0208685 A1 | 8/2013 | Zhang et al. | |
| 2013/0235819 A1 | 9/2013 | Zhang | |
| 2013/0301452 A1 | 11/2013 | Yoon | |
| 2014/0003375 A1 | 1/2014 | Nam et al. | |
| 2014/0071936 A1* | 3/2014 | Zhang | H04L 25/0226 370/330 |
| 2014/0211754 A1 | 7/2014 | Li et al. | |
| 2014/0247775 A1 | 9/2014 | Frenne et al. | |
| 2014/0254530 A1 | 9/2014 | Kim et al. | |
| 2016/0173255 A1 | 6/2016 | Lee et al. | |
| 2016/0323027 A1 | 11/2016 | Zhu et al. | |

FOREIGN PATENT DOCUMENTS

| | | |
|---|---|---|
| KR | 10-2010-0051529 | 5/2010 |
| KR | 10-2011-0033974 | 4/2011 |
| KR | 10-2011-0043493 | 4/2011 |
| KR | 10-2011-0081106 | 7/2011 |
| WO | 2010147419 | 12/2010 |
| WO | 2011028079 | 3/2011 |
| WO | 2011047351 | 4/2011 |
| WO | 2012148442 | 11/2012 |
| WO | 2012148475 | 11/2012 |

OTHER PUBLICATIONS

Non-Final Office Action dated Nov. 24, 2014, in U.S. Appl. No. 13/670,915.
Final Office Action dated Jul. 17, 2015, in U.S. Appl. No. 13/670,915.
Notice of Allowance dated Apr. 13, 2016, in U.S. Appl. No. 13/670,915.
Office Action dated Nov. 1, 2016, issued in Chinese Patent Application No. 2012800650668.

* cited by examiner

APPARATUS AND METHOD FOR ESTIMATING CHANNEL

CROSS-REFERENCE TO RELATED APPLICATIONS

This application is a Continuation of U.S. patent application Ser. No. 13/670,915, filed Nov. 7, 2012, and claims priority from and the benefit under 35 U.S.C. § 119(a) of Korean Patent Application No. 10-2011-0115448, filed on Nov. 7, 2011, each of which is incorporated herein by reference for all purposes.

BACKGROUND

Field

The following description relates to a wireless communication system and method, and more particularly to an apparatus and method for transmitting a reference signal in a wireless communication system, and an apparatus and method for estimating a channel by using the same.

Discussion of the Background

With technological progress of communication systems, consumers, such as companies and individuals, have used a wide variety of wireless terminals.

In general mobile communication systems, as a high-speed and high-capacity communication system capable of transmitting and receiving various data, such as images and wireless data beyond voice-oriented services, it may be desirable to develop a technology capable of transmitting a large amount of data coming close to that of a wired communication network. In addition, an appropriate error detection scheme in which system performance can be improved by minimizing information loss and increasing system transmission efficiency, becomes an essential aspect in such a system.

Also, in many current communication systems, various reference signals are used to provide information on a communication environment and the like to a counterpart apparatus in uplink or downlink.

Also, multi-cell (or multi-point) cooperation has been introduced to increase the performance and communication capacity of a wireless communication system. The multi-cell (or multi-point) cooperation is also referred to as cooperative multiple point transmission and reception (CoMP). The CoMP includes a beam avoidance technique in which adjacent cells (or points) cooperatively mitigate interference caused to a user at a cell (or point) boundary, and a joint transmission technique in which adjacent cells cooperatively transmit identical data, or the like.

In a next-generation wireless communication system, such as those set by the Institute of Electrical and Electronics Engineers (IEEE) or $3^{rd}$ Generation Partnership Project (3GPP), including IEEE 802.16m and 3GPP long term evolution (LTE)-Advanced, an improvement in the performance of users who are located at a cell boundary and are subject to significant interference from adjacent cells, is recognized as an important requirement.

SUMMARY

Exemplary embodiments of the prevent invention provide an apparatus and a method for generating a reference signal.

Additional features of the invention will be set forth in the description which follows, and in part will be apparent from the description, or may be learned by practice of the invention.

Exemplary embodiments of the present invention provide a method for transmitting a reference signal by a transmission point interlocked with a mobile station to the mobile station, the method including: selecting one of a first initialization value and a second initialization value; generating selection instruction information corresponding to the selected initialization value; transmitting the selection instruction information to the mobile station; generating a reference signal based on the selected initialization value; and transmitting the generated reference signal to the mobile station.

Exemplary embodiments of the present invention provide a method for estimating a channel by a mobile station interlocked with a transmission point, the method including: receiving selection instruction information indicating a selection of at least one of a first initialization value and a second initialization value; receiving a first reference signal based on the selection instruction information from the transmission point; generating a second reference signal based on an initialization value indicated as being selected by the selection instruction information by using initialization value generation information; and estimating a channel state by comparing the first reference signal with the second reference signal.

Exemplary embodiments of the present invention provide an apparatus to transmit a reference signal to be interlocked with a mobile station, the mobile station including: a selection instruction information generator to generate selection instruction information to indicate a selection of at least one of a first initialization value and a second initialization value; a reference signal generator to generate a downlink reference signal according to the selection instruction information; and a transmitter to transmit the selection instruction information and the generated reference signal to the more mobile station.

Exemplary embodiments of the present invention provides an apparatus interlocked with a transmission point to estimate a channel state, the apparatus including: a reference signal receiver to receive a reference signal from the transmission point; a selection instruction information receiver to receive, from the transmission point, selection instruction information to indicate a selection of at least one of a first initialization value and a second initialization value of a first reference signal; a reference signal generator to generate a downlink reference signal according to the selection instruction information; and a transmitter to transmit the selection instruction information and the generated reference signal to the more mobile station.

It is to be understood that both the foregoing general description and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
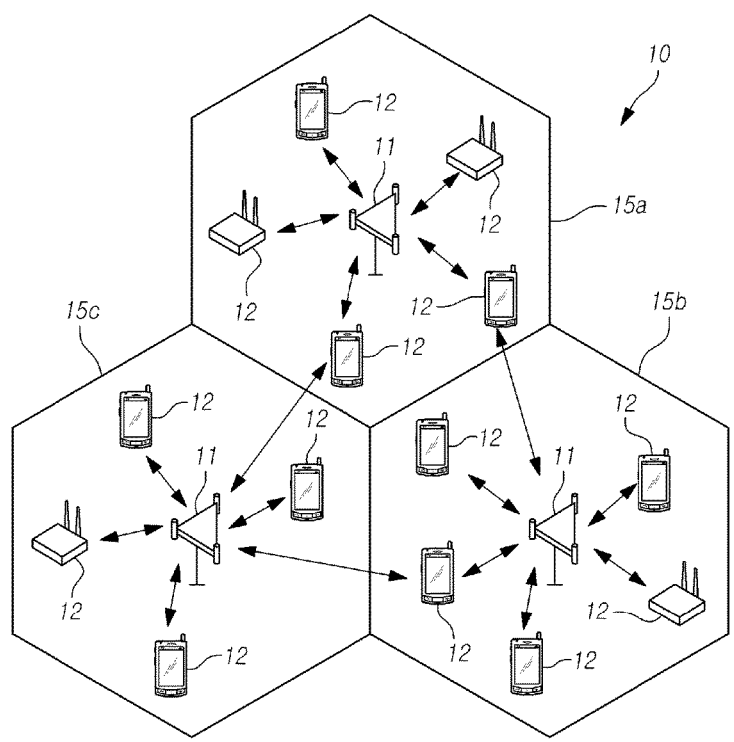
FIG. 1 is a schematic diagram illustrating a wireless communication system according to an exemplary embodiment of the present invention.

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of X, Y, and Z" can be construed as X only, Y only, Z only, or any combination of two or more items X, Y, and Z (e.g., XYZ, XZ, XYY, YZ, ZZ). Throughout the drawings and the detailed description, unless otherwise described, the same drawing reference numerals are understood to refer to the same elements, features, and structures. The relative size and depiction of these elements may be exaggerated for clarity, illustration, and convenience.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

FIG. 1 is a schematic diagram illustrating a wireless communication system according to an exemplary embodiment of the present invention.

Referring to FIG. 1, a wireless communication system 10 is arranged to provide various communication services, such as voice and packet data. The wireless communication system 10 includes at least one Base Station (BS) 11. The BS 11 may provide a communication service to a particular geographical area or frequency domain, and may be called or referred to as a "site." A site may be divided into multiple areas or cells, including a first cell 15a, a second cell 15b, and a third cell 15c, which may also be called sectors, and the sectors or cells may have different cell identifiers (IDs), respectively.

A Mobile Station (MS) or User Equipment (UE) 12 may be a stationary device or a device having mobility. The MS 12 may be called different terms, such as a UE, a Mobile Terminal (MT), a user terminal (UT), a subscriber station (SS), a wireless device, a personal digital assistant (PDA), a wireless modem, and a handheld device.

The BS 11 may refer to a station communicating with the MS 12, and may be called different terms, such as an evolved-NodeB (eNodeB), a Base Transceiver System (BTS), an access point, a femto eNodeB, a Home eNodeB (HeNodeB), a relay, and a Remote Radio Head (RRH). One or more of the first cell 15a, the second cell 15b and the third cell 15c may indicate a partial area covered by the BS 11, and may refer to various coverage areas, such as a mega cell, a macro cell, a micro cell, a pico cell, and a femto cell.

In this specification, a subject that may transmit and/or receive a reference signal to/from the MS may be described with respect to an eNodeB, but aspects of the invention are not limited thereto. Accordingly, the subjects may be interpreted as including some or all subjects that may be capable of transmitting and receiving signals, which may be differently expressed according to differences between communication schemes and the like, or which may perform similar or equivalent operations.

In this specification, the MS (or UE) and the BS (or eNodeB), which may be two transmission and/or reception subjects referred to with respect to exemplary embodiments or the technical aspects described in this specification are exemplary, and are not limited to a particularly designated term or word.

Hereinafter, downlink may indicate or signify communication or a communication path from the BS 11 to the MS 12, and uplink may indicate or signify communication or a communication path from the MS 12 to the BS 11. In downlink, a transmitter may be a part of the BS 11, and a receiver may be a part of the MS 12. In uplink, a transmitter may be a part of the MS 12, and a receiver may be a part of the BS 11. However, aspects of the invention may not be limited thereto, such that various access schemes may be applied to the wireless communication system 10.

For example, various multiple access schemes may include, without limitation, a Code Division Multiple Access (CDMA), a Time Division Multiple Access (TDMA), a Frequency Division Multiple Access (FDMA), a Orthogonal Frequency Division Multiple Access (OFDMA), a Single Carrier-FDMA (SC-FDMA), an OFDM-FDMA, an OFDM-TDMA, and an OFDM-CDMA. These modulation techniques may be used to demodulate signals received from multiple users of a communication system, and increase the capacity of the communication system. In this respect, use may be made of a Time Division Duplex (TDD) scheme in which uplink (UL) transmission and downlink (DL) transmission may be performed at different times. Otherwise, use may be made of a Frequency Division Duplex (FDD) scheme in which uplink transmission and downlink transmission may be performed by using different frequencies.

The wireless communication system 10 may be a CoMP system. The CoMP system may refer to a communication system that supports CoMP, or a communication system to which the CoMP may be applied. The CoMP may be a technology to coordinate or combine signals transmitted or received by multiple transmission/reception points. The CoMP may increase a data transmission rate or throughput, and may provide high quality of data.

A transmission/reception point may refer to, without limitation, at least one of a component carrier, a cell, a base station (e.g., a macro cell, a pico eNodeB, or a femto eNodeB), and an RRH. Otherwise, the transmission/reception point may refer to a set of antenna ports. Also, the transmission/reception point may transmit information from a set of antenna ports to the MS through Radio Resource Control (RRC) signaling. Accordingly, multiple Transmission Points (TPs) in one cell may be referred to as a set of antenna ports. An intersection between the antenna port sets may be an empty set.

BSs or cells may form multiple transmission/reception points, respectively. For example, the multiple transmission/reception points may be macro cells forming a homogeneous network. Further, the multiple transmission/reception points may be a macro cell and RRHs having high transmission power or a macro cell and RRHs having low transmission power in the macro cell area.

The CoMP system may selectively apply CoMP. A mode in which the CoMP system may perform communication by using the CoMP may be referred to as a CoMP mode. In contrast, a mode in which the CoMP system may not perform communication by using the CoMP may be referred to as a normal mode or a non-CoMP mode.

The MS 12 may be a CoMP terminal. The CoMP terminals may be elements forming the CoMP system, and communicate with a CoMP set. One or more CoMP terminals may also operate in a CoMP mode or in a normal mode, similarly to the CoMP system. Further, the CoMP set may be a set of transmission/reception points, which directly and/or indirectly participates in the transmission of data to the CoMP terminals on a certain time-frequency resource.

Direct participation in the transmission or reception of data may indicate that transmission/reception points may transmit or receive data to or from the CoMP terminals on the relevant time-frequency resource. Indirect participation in the transmission or reception of data may indicate that the transmission/reception points may not transmit or receive data to or from the CoMP terminals on the relevant time-frequency resource but may contribute to a determination of user scheduling/beamforming.

The CoMP terminals may simultaneously receive signals from the CoMP set, or may simultaneously transmit signals to the CoMP set. Further, the CoMP system may reduce an interference effect between CoMP sets in view of a channel environment of one or more cells forming the CoMP set.

When operating the CoMP system, various scenarios may be available. A first CoMP scenario may correspond to a CoMP formed by a homogeneous network of multiple cells in one BS, and may be called an intra-site. A second CoMP scenario may correspond to a CoMP formed by a homogeneous network of one macro cell and one or more high-power RRHs. One or more of a third CoMP scenario and a fourth CoMP scenario may correspond to a CoMP formed by a heterogeneous network of one macro cell and one or more low-power RRHs in the macro cell area. When cell IDs of the RRHs are not identical or do not correspond to a cell ID of the macro cell, such scenario may correspond to the third CoMP scenario. Further, when the cell IDs of the RRHs are all identical or correspond to the cell ID of the macro cell, such scenario may correspond to the fourth CoMP scenario. However, aspects of the invention are not limited thereto, such that additional CoMP scenarios may be available.

The category of CoMP may include Joint Processing (JP) and Coordinated Scheduling/Beamforming (CS/CB), and it may be possible to mix JP with CS/CB.

With respect to JP, data on an MS may be used by at least one transmission/reception point in a CoMP set on a certain time-frequency resource. The JP may include, without limitation, Joint Transmission (JT) and Dynamic Point Selection (DPS).

JT may indicate multiple transmission/reception points belonging to a CoMP set may simultaneously transmit data to one MS or multiple MSs on a time-frequency resource. With respect to JT, multiple cells (i.e., multiple transmission/reception points), which may transmit data to one MS, may perform the transmission on an identical or corresponding time/frequency resource.

With respect to DPS, one transmission/reception point in a CoMP set may transmit data on a time-frequency resource. A transmission/reception point may change in one or more subframes in view of interference. The transmitted data may be simultaneously used by multiple transmission/reception points. The DPS may include, without limitation, a dynamic cell selection.

With respect to the CS, one transmission/reception point in a CoMP set may transmits data on a time-frequency resource, and user scheduling may be determined by coordination among points in the relevant CoMP set.

With respect to the CB, user scheduling may also be determined by coordination among points in the relevant CoMP set. Interference occurring between an adjacent cell and MSs may be avoided by the CB.

The CS/CB may include Semi-Static Point Selection (SSPS) capable of semi-statically selecting a transmission/reception point and changing the semi-statically selected transmission/reception point.

As described above, it may be possible to mix the JP with the CS/CB. For example, some transmission/reception points in a CoMP set transmit data to target MSs according to the JP, and the other transmission/reception points in the CoMP set may perform the CS/CB.

A transmission/reception point may include, without limitation, a BS, a cell, or an RRH. More specifically, a BS or an RRH may become a transmission/reception point. Further, multiple BSs and/or RRHs may become multiple transmission/reception points. Although the specification may be described with respect to BHs and RRHs, aspects of the invention are not limited thereto, such that operations of all BSs or RRHs may be applied to other types of transmission/reception points.

Further, control information of a physical layer mapped to a Physical Downlink Control Channel (PDCCH) may be used in the physical layer may be referred to as Downlink Control Information (DCI). The DCI may be transmitted through the PDCCH. Further, the DCI may include an uplink or downlink resource allocation field, uplink transmission power control instruction field, a control field for paging, a control field for instructing a Random Access (RA) response, and the like.

According to the format of the DCI, the use of the DCI changes, and the type of a field defined in the DCI may also change. Table 1 may show the DCI according to the DCI format.

TABLE 1

| DCI format | Description |
|---|---|
| 0 | used for the scheduling of PUSCH (uplink grant) |
| 1 | used for the scheduling of one PDSCH codeword in one cell |
| 1A | used for the compact scheduling of one PDSCH codeword in one cell and a random access procedure initiated by a PDCCH instruction |
| 1B | used for the compact scheduling of one PDSCH codeword in one cell, which uses precoding information |
| 1C | used for the compact scheduling of one PDSCH codeword and the notification of change of NCCH |
| 1D | used for the compact scheduling of one PDSCH codeword in one cell, which includes precoding and power offset information |
| 2 | used for the PDSCH scheduling of MSs configured in a spatial multiplexing mode |
| 2A | used for the PDSCH scheduling of MSs configured in a large-delay CDD mode |
| 2B | used in a transmission mode 8 (dual-layer transmission) |
| 2C | used in a transmission mode 9 (multi-layer transmission) |
| 3 | used for the transmission of TPC instructions for PUCCH and PUSCH, which includes 2-bit power adjustments |
| 3A | used for the transmission of TPC instructions for PUCCH and PUSCH, which includes single bit power adjustments |
| 4 | used for the scheduling of PUSCH (uplink grant), and particularly, used for the PUSCH scheduling of MSs configured in a spatial multiplexing mode |

Referring to Table 1, the DCI includes the DCI format 0 indicating uplink scheduling information, the format 1 for the scheduling of one PDSCH codeword, the format 1A for the compact scheduling of one PDSCH codeword, the format 10 for a more compact scheduling of Downlink Shared Channel (DL-SCH), the format 2 for PDSCH scheduling in a closed-loop spatial multiplexing mode, the format 2A for PDSCH scheduling in an open-loop spatial multiplexing mode, the format 3 and format 3A each for the transmission of a Transmission Power Control (TPC) instruction for an uplink channel and the like.

Fields of the DCI may be sequentially mapped to an n number of information bits $a_0$ to $a_{n-1}$, respectively. For example, when the DCI is mapped to information bits having a total length of 44 bits, fields of the DCI may be sequentially mapped to a range of $a_0$ to $a_{43}$, respectively. The DCI format 0, format 1A, format 3 and format 3A may have a similar or an identical payload size. The DCI format 0 may also be called an uplink grant.

In the wireless communication system, it may be possible to estimate an uplink channel or a downlink channel for the purpose of the transmission and reception of data, the acquisition of system synchronization, the feedback of channel information, and the like. A process for reconstructing a transmission signal by compensating for the distortion of a signal, which may result from a sudden change in a channel environment, may be referred to as channel estimation. Also, a channel state of a cell (or point), to which an MS belongs or another cell (or point) may be measured. Further, a reference signal known to both the MS and a transmission/reception point may be used to estimate a channel or measure a channel state.

Because the MS may know or be aware of information of the reference signal, it may estimate a channel and may compensate for a channel value based on the received reference signal. Further, the MS may accurately obtain data transmitted by the transmission/reception point.

Further, a reference signal may be generated and transmitted based on a sequence of the reference signal. One or more of various sequences having excellent or reference correlation characteristics may be used as sequences for the reference signal. For example, a Constant Amplitude Zero Auto-Correlation (CAZAC) sequence of a Zadoff-Chu (ZC) sequence and the like, or a pseudo-noise (PN) sequence of an m-sequence, a Gold sequence, a Kasami sequence and the like may be used as a sequence for the reference signal. In addition, according to system conditions, various other sequences having excellent or reference correlation characteristics may be used as sequences for the reference signal. Also, in order to adjust the length of the reference signal sequence, the reference signal sequence may first be subjected to cyclic extension or truncation, and may then be used. Further, the reference signal sequence may first be modulated in various forms, for example, by using Binary Phase Shift Keying (BPSK) or Quadrature Phase Shift Keying (QPSK), and may then be mapped to a Resource Element (RE).

Downlink reference signals may include a Cell-specific Reference Signal (CRS), a Multimedia Broadcast and multicast Single Frequency Network Reference Signal (MBSF-NRS), a UE-specific Reference Signal or a Demodulation Reference Signal (DM-RS) according to the use of the signal, a Positioning Reference Signal (PRS), and a Channel State Information Reference Signal (CSI-RS).

The CRS, which may be a reference signal transmitted to some or all MSs in a cell, may be used to estimate a channel. The CRS may be transmitted through some or all downlink subframes in a cell, which may support PDSCH transmission.

The UE-specific RS or the DM-RS, which may be a reference signal received by a particular MS or a particular MS group in a cell, may be used for the demodulation of data in the particular MS or the particular MS group.

The MBSFN RS may be a reference signal to provide a Multimedia Broadcast Multicast Service (MBMS), and the PRS may be used as a reference signal to measure the location of an MS.

The CSI-RS may be used to estimate channel state information. The CSI-RS may be arranged in the frequency or time domain. The MS may report at least one of a Channel Quality Indicator (CQI), a Precoding Matrix Indicator (PMI) and a Rank Indicator (RI) as channel state information through the estimation of a channel state which uses the CSI-RS. The CSI-RS may be transmitted from one or more antenna ports.

In the CoMP system, multiple cells or transmission/reception points may also transmit reference signals to MSs.

In a CoMP environment, consideration may be given to a method and an apparatus to ensure the orthogonality of an existing reference signal, which may be configured in the conventional single cell, even in multiple cells or TPs. More specifically, consideration may be given to both a method and an apparatus to generate a reference signal sequence, which may be integrated by considering the existing MIMO environment and the above CoMP environment, and a method and an apparatus to signal information related to the generation of the reference signal sequence.

Figure 2:
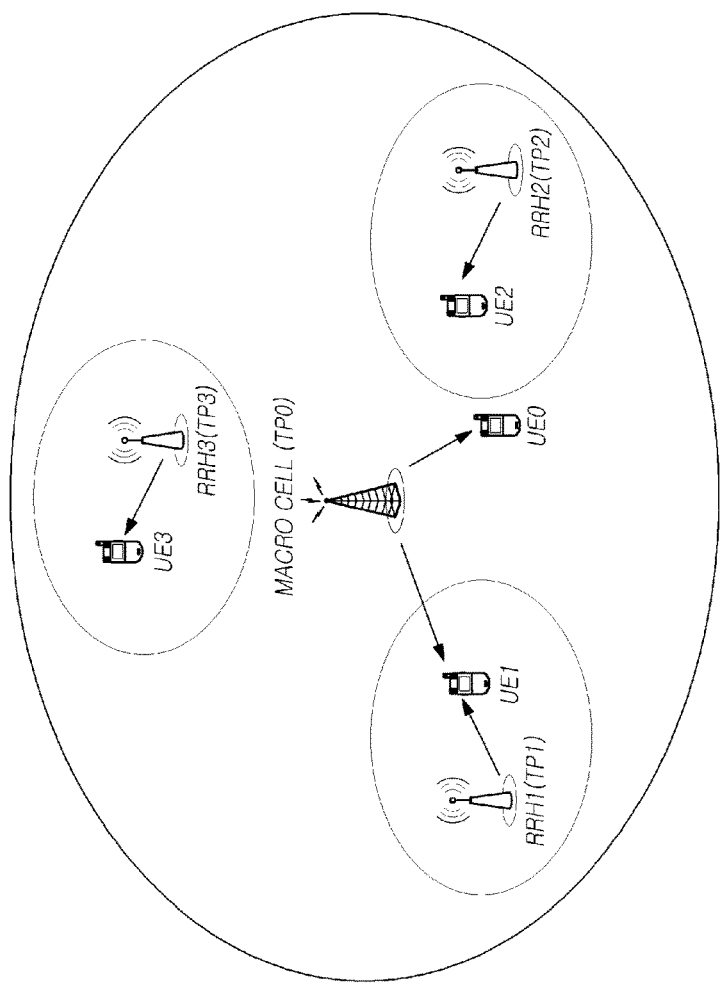
FIG. 2 is a diagram illustrating a macro cell and Remote Radio Heads (RRHs) forming a cooperative multiple point transmission and reception (CoMP) set and user equipments (UEs) performing transmission and reception with the cells and RRHs according to an exemplary embodiment of the present invention.

FIG. 2 is a diagram illustrating a macro cell and RRHs forming a CoMP set and UEs performing transmission and reception with the cells and RRHs according to an exemplary embodiment of the present invention.

As shown in FIG. 2, a first UE 0, a second UE 1, a third UE 2 and a fourth UE 3 may be connected to a first TP 0, a second TP 1, a third TP 2 and a fourth TP 3, respectively. The first UE 0, the second UE 1, the third UE 2 and the fourth UE 3 have the first TP 0, the second TP 1, the third TP 2 and the fourth TP 3 as their serving cells or points, respectively. Referring to FIG. 2, where the first TP 0 is matched to a macro cell, the second TP 1 is matched to a first RRH 1, the third TP 2 is matched to a second RRH 2, and the TP 3 may be matched to a third RRH 3. Also, at least one of the first UE 0, the second UE 1, the third UE 2 and the fourth UE 3 may share a bandwidth allocated to each UE and a part or the whole of a bandwidth allocated to the other UEs at frequencies between them.

Further, when a reference signal, such as a DM-RS, is transmitted from each cell to a UE in the wireless communication system, such as long term evolution (LTE), a sequence for a reference signal may be generated as shown in Equation (1) below. The generated reference signal sequence may be mapped to a Resource Element (RE), and a signal may be generated and the generated signal may be transmitted to one or more UEs.

$$r(m) = \frac{1}{\sqrt{2}}(1 - 2 \cdot c(2m)) + j\frac{1}{\sqrt{2}}(1 - 2 \cdot c(2m+1)), \quad (1)$$

where $m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}$, and $$c_{init} = (\lfloor n_g/2 \rfloor + 1) \cdot (2N_{ID}^{cell} + 1) \cdot 2^{16} + n_{SCID}$$

In Equation (1), a reference signal sequence r(m) is generated from a PN sequence (c(2m) and c(2m+1)) along the real axis and the imaginary axis on the complex plane. $c_{init}$ may refer to an initialization value of the PN sequence that may have a value, which changes according to a slot number $n_s$, a cell ID $N_{ID}^{cell}$, and the value of a Scrambling Code Identity (SCID) $n_{SCID}$.

In Equation (1), a DCI format 2B capable of using antenna port 7 and/or port 8, the SCID $n_{SCID}$ may be indicated by 1-bit information on a scrambling identity. Also, referring to a DCI format 2C capable of using at least one of an antenna port 7, an antenna port 8, an antenna port 9, an antenna port 10, an antenna port 11, an antenna port 12, an antenna port 13, and an antenna port 14, the SCID $n_{SCID}$ may be indicated by 3-bit information on antenna port(s), a scrambling identity and the number of layers, which are included in the DCI format 2C, as shown in Table 2 below. More specifically, as shown in Table 2, in the DCI format 2C, the SCID has a value of 0 or 1 for the antenna port 7 and/or the antenna port 8, and may have a value of 0 for the other antenna ports.

TABLE 2

| One Codeword: Codeword 0 enabled and Codeword 1 disabled | | Two Codewords: Codeword 0 enabled and Codeword 1 enabled | |
|---|---|---|---|
| Value | Message | Value | Message |
| 0 | 1 layer, port 7 and $n_{SCID} = 0$ | 0 | 2 layers, ports 7-8 and $n_{SCID} = 0$ |
| 1 | 1 layer, port 7 and $n_{SCID} = 1$ | 1 | 2 layers, ports 7-8 and $n_{SCID} = 1$ |
| 2 | 1 layer, port 8 and $n_{SCID} = 0$ | 2 | 3 layers and ports 7-9 |
| 3 | 1 layer, port 8 and $n_{SCID} = 1$ | 3 | 4 layers and ports 7-10 |
| 4 | 2 layers and ports 7-8 | 4 | 5 layers and ports 7-11 |
| 5 | 3 layers and ports 7-9 | 5 | 6 layers and ports 7-12 |
| 6 | 4 layers and ports 7-10 | 6 | 7 layers and ports 7-13 |
| 7 or | Reserved | 7 | 8 layers and ports 7-14 |

| One Codeword: Codeword 0 enabled and Codeword 1 disabled | | Two Codewords: Codeword 0 enabled and Codeword 1 enabled | |
|---|---|---|---|
| Value | Message | Value | Message |
| 0 | 1 layer, port 7 and SCID = 0 | 0 | 2 layers, ports 7-8 and SCID = 0 |
| 1 | 1 layer, port 7 and SCID = 1 | 1 | 2 layers, ports 7-8 and SCID = 1 |
| 2 | 1 layer, port 8 and SCID = 0 | 2 | 3 layers, ports 7-9 and SCID = 0 |

TABLE 2-continued

| 3 | 1 layer, port 8 and SCID = 1 | 3 | 4 layers, ports 7-10 and SCID = 0 |
| 4 | 2 layers, ports 7-8 and SCID = 0 | 4 | 5 layers, ports 7-11 and SCID = 0 |
| 5 | 3 layers, ports 7-9 and SCID = 0 | 5 | 6 layers, ports 7-12 and SCID = 0 |
| 6 | 4 layers, ports 7-10 and SCID = 0 | 6 | 7 layers, ports 7-13 and SCID = 0 |
| 7 | Reserved | 7 | 8 layers, ports 7-14 and SCID = 0 |

Further, a current method for generating a reference signal sequence, as shown in Equation (1) may be defined specifically for a single cell. Accordingly, in an environment, such as a CoMP environment, where multiple cells or points are considered, a problem may occur in the orthogonality of reference signals.

Figure 3:
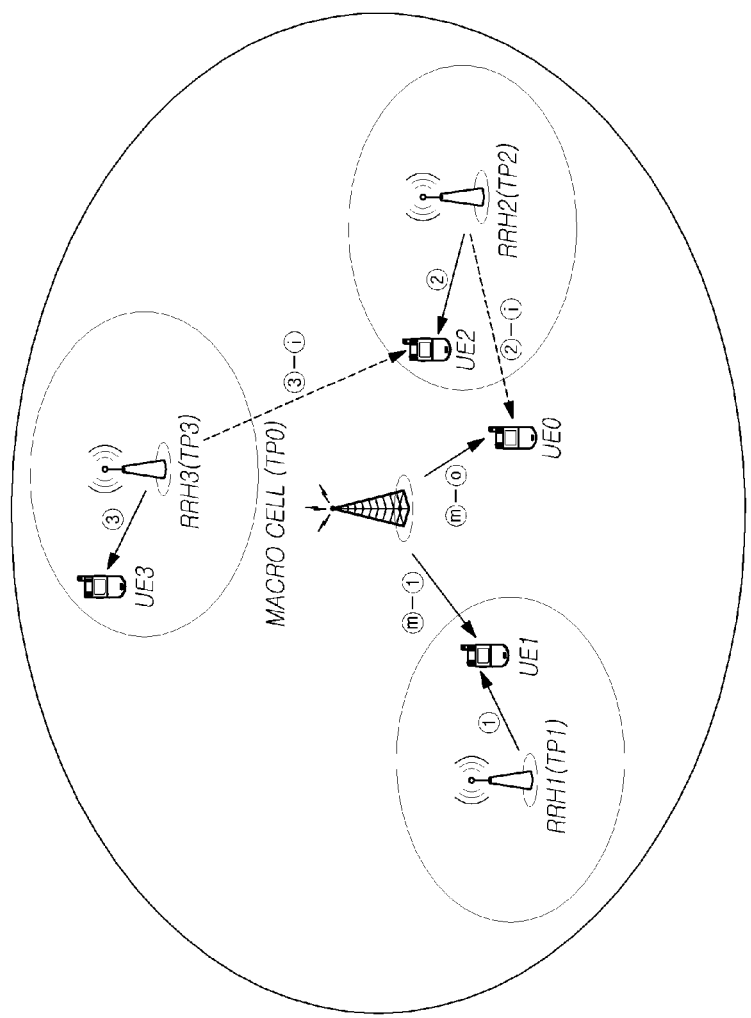
FIG. 3 is a diagram illustrating an environment facilitating a transmission of reference signals from Transmission Points (TPs) to multiple mobile stations according to an exemplary embodiment of the present invention.

FIG. 3 is a diagram illustrating an environment facilitating a transmission of reference signals from Transmission Points (TPs) to multiple mobile stations according to an exemplary embodiment of the present invention.

As shown in FIG. 3, the TP 0 corresponding to a macro cell transmits a reference signal to one or more of the UE 0 and the UE 1 on an identical time-frequency resource. Accordingly, this situation may be regarded as an example of MU-MIMO. In order to distinguish between (m)-(o) and (m)-(1) corresponding to two reference signals simultaneously transmitted to the UE 0 and the UE 1 on a time-frequency resource, the two reference signals (m)-(o) and (m)-(1) may use an identical reference signal sequence, and may be distinguished from each other by using an orthogonal sequence, such as an Orthogonal Cover Code (OCC). However, aspects of the invention are not limited thereto, such that TP 0 may transmit a reference signal to one or more of the UE 0 and UE 1 on a similar or corresponding time-frequency resource. Further, two reference signals may be transmitted to the UE 0 and the UE 1 within a reference time period.

Also, the RRH 1 (i.e., TP 1) transmits a reference signal to the UE 1. When the UE 1 is a CoMP UE as shown in FIG. 3, the UE 1 simultaneously receives reference signals (m)-(1) and (1) from the TP 0 corresponding to the macro cell as well as from the RRH 1 on a time-frequency resource according to Joint Transmission (JT) CoMP. Further, the two reference signals (m)-(1) and (1) may also use an identical or corresponding reference signal sequence. Therefore, the reference signals (m)-(o), (m)-(1), and (1) as illustrated in FIG. 3 may use an identical or corresponding reference signal sequence.

When MU-MIMO and CoMP are not simultaneously supported on an identical time-frequency resource, three reference signal sequences as illustrated in FIG. 3 may not be identical. More specifically, when the MU-MIMO is supported, (m)-(o) and (m)-(1) may use an identical or corresponding reference signal sequence. When the CoMP is supported, (m)-(1) and (1) may use an identical or corresponding reference signal sequence.

Further, as shown in FIG. 3, the RRH 2 (i.e., TP 2) and the RRH 3 (i.e., TP 3) transmit reference signals to the UE 2 and the UE 3, respectively. More specifically, an example of a method in which the RRH 2 and the RRH 3 transmit signals to the UE 2 and the UE 3 in the CoMP environment, respectively, may be DPS or CS/CB, but the exemplary embodiments of the present invention may not be limited thereto. The RRH2 may transmit the reference signal (2) to the UE 2, and the reference signal (2) may act as interference (2)-i from the viewpoint of the UE 0. Similarly, the RRH 3 may transmits a reference signal (3) to the UE 3, but the reference signal (3) may act as interference (3)-i from the viewpoint of the UE 2.

More specifically, in order to solve the problem of interference (e.g., interference between (m)-(o) and (2)-i in the UE 0 and interference between (2) and (3)-i in the UE 2 in FIG. 3), different reference signal sequences may be used.

Accordingly, in the CoMP environment where multiple cells or points are considered as well as a single cell, one or more TPs (e.g., TP 0 and TP 1 that may simultaneously transmit signals to the UE 1 on a time-frequency resource) that may be configured to transmit signals to a particular UE (e.g., UE 1), may transmit an identical, similar, or corresponding reference signal. However, one or more TPs (e.g., TP 2 and TP 3 that transmit signals to the UE 2 and the UE 3, respectively) that do not transmit signals to the particular UE (e.g., the UE 1) may generate different reference signal sequences to generate and transmit reference signals different from the reference signal transmitted to the particular UE.

More specifically, in the CoMP environment where the multiple cells or points may be considered as well as the single cell, when the cells or TPs transmit reference signals to the UEs, at least one of a reference signal transmitted from the TP 2 (i.e., RRH 2) to the UE 2 and a reference signal transmitted from the TP 3 (i.e., RRH 3) to the UE 3 may request generation of different reference signal sequences. According to aspects of the invention, the cells or TPs transmit reference signals to the UEs to give or provide pseudo orthogonality of the reference signals.

Further, at least one of a reference signal (m)-(o) transmitted from the TP 0 (i.e., macro cell) to the UE 0 and reference signals (m)-(1) and (1) transmitted from the TP 0 (i.e., macro cell) and the TP 1 (i.e., RRH 1) to the UE 1 may have an identical, similar, or corresponding reference signal sequence. However, in order to give the pseudo orthogonality of reference signals, at least one of the reference signals (m)-(o), (m)-(1) and (1) a reference signal (2) transmitted from the TP 2 (RRH 2) to the UE 2, and a reference signal transmitted from the TP 3 (RRH 3) to the UE 3, may have different reference signal sequences.

As described above, one or more CoMP scenario may use a method for generating a reference signal sequence to transmit identical or different reference signal sequences to multiple UEs. The method with respect to below scenario types will be described in more detail below.

Scenario type 1: When cells or TPs have different cell IDs (, CoMP scenarios 1, 2, and 3).

Scenario sub-type 1: An algorithm for generating identical reference signal sequences.

A sequence may be generated based on a common cell ID, which may be common between the cells, differently from Equation (1), to generate identical, similar, or corresponding reference signal sequences despite different cell IDs of TPs in view of the inter-cell orthogonality of reference signals. For example, at least one of the reference signal (m)-(o) transmitted from the TP 0 (i.e., macro cell) to the UE 0, and the reference signals (m)-(1) and (1) transmitted from the TP 0 (i.e., macro cell) and the TP 1 (i.e., RRH 1) to the UE 1, as illustrated in FIG. 3, may request to generate a reference signal sequence based on an identical cell ID.

When the CoMP and the MU-MIMO are not simultaneously supported on an identical time-frequency resource, there may be nothing to change from the viewpoint of a UE. More specifically, one or more UEs may follow a cell ID of a cell or a transmission/reception point, to which the respective UE may belong. Accordingly, one or more UEs may not be separately notified of information on the common cell ID, which may be common between the cells. An eNodeB may know of the information on the common cell ID, and may generate a sequence based on the common cell ID. More specifically, from the viewpoint of the eNodeB, a method for generating a reference signal sequence may change.

When the CoMP and the MU-MIMO are simultaneously supported on an identical time-frequency resource, a cell ID of a cell or a transmission/reception point to which one or more UE may belong, may differ from the common cell ID. Accordingly, one or more UEs may be separately notified of the information on the common cell ID, which may be common between the cells. The eNodeB may generate a sequence based on the common cell ID. More specifically, from the viewpoint of the eNodeB and the UE, conditions related to the reference signal sequences may be changed from the existing ones.

Scenario sub-type 2: An algorithm for generating different reference signal sequences In this scenario sub-type, the TPs may have different cell IDs. Accordingly, the method for generating a cell-specific reference signal sequence as shown in Equation (1) may sufficiently enable the generation of different reference signal sequences. More specifically, from the viewpoint of the eNodeB and the UE, conditions related to the reference signal sequences may not be changed from the existing ones.

Further, it may be possible to generate different reference signal sequences according to the UEs or TPs to further subdivide the reference signal sequences.

Scenario type 2: When cells or TPs all have an identical cell ID (e.g., CoMP scenario 4)

Scenario sub-type 1: An algorithm for generating identical reference signal sequences When the TPs have different cell IDs, a sequence may be generated based on a common cell ID, which may be common between the cells, differently from Equation (1), in order to generate identical reference signal sequences. However, the CoMP scenario 4 may have a CoMP environment where some or all points may have an identical cell ID. Thus, the CoMP scenario 4 may correspond to an environment where some or all points may already use a common cell ID as their cell IDs. Accordingly, the method for generating a cell-specific reference signal sequence as shown in Equation (1) may sufficiently enable the generation of different reference signal sequences. More specifically, from the viewpoint of the eNodeB and the UE, conditions related to the reference signal sequences may not have to be changed from the existing ones.

Scenario sub-type 2: An algorithm for generating different reference signal sequences In this scenario sub-type, the TPs may have an identical cell ID. Accordingly, the method for generating a cell-specific reference signal sequence as shown in Equation (1) may not enable the generation of different reference signal sequences. Accordingly, it may be possible to modify the method for generating a reference signal sequence as shown in Equation (1) and generate reference signal sequences different according to the UEs or TPs. Further, the initialization value $c_{init}$ as defined by Equation (1) may be set differently for one or more UEs or TPs to generate different reference signal sequences. Information used to set the initialization value different for one or more UEs or TPs may be defined as initialization value generation information.

More specifically, the initialization value generation information for generating reference signal sequences, which may be different according to the UEs or TPs, may be transmitted from the TP to UEs. Accordingly, from the viewpoint of the TP (or eNodeB) and the UE, conditions related to the reference signal sequences may be changed from the existing ones.

When the reference signal sequences are generated according to the above schemes and information associated with the generation of the reference signal sequences is signaled to the UE as described above, a reference signal may be generated and the generation of the reference signal may be signaled to the UE. The reference signal sequence generation and signaling of information associated with the generation of the reference signal sequence may be performed to separately consider one or more CoMP scenario environment and the existing single cell environment. However, it may be more effective to use a generation method and a signaling method, which may be integrated as one element.

Further, according to exemplary embodiments of the present invention provide a method for using multiple initialization values, such as a first initialization value for generating identical sequences (hereinafter, referred to as a "first initialization value" or an "initialization value A") and a second initialization value for generating a different sequence (hereinafter, referred to as "second initialization values" or "initialization values B"), as the initialization value for the sequence used during the generation of a downlink reference signal sequence. Further, one of the two initialization values may be selected and a sequence may be generated according to conditions of one or more UEs, in which instruction information related to such a selection may be signaled to one or more UEs.

Hereinafter, various methods of value generation may be provided, including (1) a method for generating an initialization value A (e.g., first initialization value) and (2) a method for generating an initialization value B (e.g., second initialization value). The initialization value generation information that may be used to generate the initialization value A and the initialization values B may be described in more detail below.

(1) The method for generating an initialization value for generating identical sequences (i.e., initialization value A or first initialization value) may be described in more detail below.

If a cell-specific initialization value used in Equation (1) is used, information, which may normally be separately and additionally signaled to the UE, may not exist. More specifically, a general communication environment, which may not be a case where multiple TPs have different cell IDs as in the CoMP scenarios 1, 2, or 3, may not request or use separate initialization value generation information, which may provide one or more reference signal sequences to be identical. Thus, the general communication environment may not signal the initialization value generation information to one or more UEs.

When the MU-MIMO and the CoMP are simultaneously considered where multiple TPs have different cell IDs, a common cell ID, which may be representative of the whole of a CoMP set, may be used instead of the cell ID $N_{ID}^{cell}$ for calculating the initialization value $c_{init}$ as defined by Equation (1).

Further, the common cell ID may be previously transmitted to the UE through high layer signaling, such as RRC.

Although this common cell ID information may have 9 bits, aspects of the invention may not be limited to such a configuration. However, even when the common cell ID may be used, in the CoMP scenario 4 or in a non-CoMP environment, the common cell ID may be identical, similar, or corresponding to a cell ID of a cell or a TP, to which a UE may belong. Accordingly, although the signaling may not be separately performed or may be separately performed, the common cell ID may become the cell ID of the cell or TP, to which the UE may belong.

More specifically, as the initialization value A, a cell-specific initialization value used in Equation (1) may be used or a CoMP set-specific initialization value may be used. When a cell-specific initialization value is used, signaling information, which may be separately indicated, may not exist. When a CoMP set-specific initialization value is used, the common cell ID information may be signaled or transmitted, as initialization value generation information, to one or more UEs. To perform the signaling or transmitting operation of the common cell ID information, high layer signaling, such as RRC may be used.

(2) The method for generating an initialization value for generating a different sequence (e.g., initialization value B or second initialization value) may be described in more detail below.

When multiple TPs have an identical cell ID, an initialization value of a cell-specific reference signal sequence as defined by Equation (1) may not enable the generation of different reference signal sequences. Accordingly, the method for generating a reference signal sequence as shown in Equation (1) may be modified and different initialization values of reference signal sequences according to the UEs or TPs may be generated. Initialization value generation information capable of generating the changed initialization values may be indicated to the UEs.

Further, when multiple TPs have different cell IDs, an initialization value of a cell-specific reference signal sequence as defined by Equation (1) may be sufficient as initialization values for generating different sequences. However, although the method for generating a reference signal sequence as shown in Equation (1) may be modified and the different initialization values of the reference signal sequences according to the UEs or TPs may be generated, the different sequences may be generated. Accordingly, the modified method may be applied equally.

The method for generating different initialization values of reference signal sequences according to the UEs or TPs may include, without limitation, one of the following methods. Initialization value generation information for generating the initialization values may be defined or transmitted in advance or ad hoc to the UEs through high layer signaling, such as RRC, so that the UEs may be aware of the initialization value generation information. As described below, in this method, $n_{SCID}$ of Equation (1), which may be an initialization value generation information for generating different initialization values may be replaced by $n_{RNTI}$ or $n'_{SCID}$. Different initialization values maybe denoted by $c_{init}$.

A first method, in which a Radio Network Temporary Identifier (RNTI) may be used.

An RNTI value may be used in place of $n_{SCID}$ as shown in Equation (1) (e.g., the parameter $n_{SCID}$ as shown in Equation (1) may be changed to a parameter $n_{RNTI}$). Accordingly, an initialization value of a sequence for a reference signal may be set differently for one or more UEs. Based on the initialization value, a reference signal sequence may be generated, which may be mapped to an RE, and a signal may be generated to be transmitted to one or more UEs.

Further, because one or more UEs may already know the RNTI, initialization value generation information, which may be signaled, may have a value of 0 bits.

More specifically, in the first method, RNTI of each UE may be used (i.e., $n_{RNTI}$ may replace $n_{SCID}$ in Equation (1)) as initialization value generation information to generate a different reference signal sequence for one or more UEs. However, because one or more UEs may already know the RNTI thereof, the initialization value generation information may not be separately signaled to one or more UEs.

A second method, in which separate UE-specific information may be used.

In the second method, separately-defined UE-specific information may be used as initialization value generation information, and this UE-specific information may be denoted by $n'_{SCID}$.

More specifically, in the second method, a parameter that may be transmitted through high layer signaling, such as UE-specific RRC, may be used in place of $n_{SCID}$ as shown in Equation (1). For example, the parameter $n_{SCID}$ may be changed to a parameter $n'_{SCID}$. Further, N-bit, in which N may be a natural number equal to or greater than 1, information may be used as UE-specific information, which may be set as $n'_{SCID}$. By using the N-bit information, different reference signal sequences according to a maximum number $2^N$ of UEs, which may simultaneously transmit reference signals on a time-frequency resource, may be generated and allocated to the UEs. Accordingly, it may be possible to give or provide the pseudo orthogonality of the reference signals.

Accordingly, in the second method, the separate UE-specific information of N bits may be used as initialization value generation information, and this UE-specific information may be transmitted to one or more UEs through RRC signaling or the like.

A third method, in which separate TP-specific information may be used.

In the third method, separately-defined TP-specific information may be used as initialization value generation information, and this TP-specific information may be denoted by $n'_{SCID}$.

More specifically, in the third method, a parameter may be transmitted through high layer signaling, such as RRC, which may be specific for a TP. Further, the parameter may be used in place of $n_{SCID}$ as shown in Equation (1). For example, the parameter $n_{SCID}$ may be changed to a parameter $n'_{SCID}$. Here, N-bit, in which N is a natural number equal to or greater than 1, information may be used as TP-specific information, which may be set as $n'_{SCID}$. By using the N-bit information, different reference signal sequences according to a maximum number $2^N$ of TPs, which may simultaneously transmit reference signals on a time-frequency resource, may be generated and allocated to the UEs. Accordingly, it may be possible to give the pseudo orthogonality of the reference signals.

Thus, in the third method, the separate TP-specific information of N bits may be used as initialization value generation information, and this TP-specific information may be transmitted to one or more UEs through RRC signaling or the like.

A fourth method, in which a CSI-RS antenna port and/or CSI-RS configuration information may be used.

In the fourth method, a parameter determined in relation to a CSI-RS antenna port and/or CSI-RS configuration information may be used in place of $n_{SCID}$ as shown in Equation (1). More specifically, a parameter $n'_{SCID}$ determined in relation to the CSI-RS antenna port and/or the CSI-RS configuration information may be used as initialization value generation information. The use of the parameter $n'_{SCID}$ as the initialization value generation information may be expressed by changing the parameter $n_{SCID}$ as shown in Equation (1) to $n'_{SCID}$.

According to exemplary embodiments, CSI-RS antenna port information having a value of 15 to 22, or CSI-RS configuration information having a value of 0 to 31, or a parameter drawn from the CSI-RS antenna port information and/or the CSI-RS configuration information may be used as initialization value generation information $n'_{SCID}$. Further, an example of the initialization value generation information $n'_{SCID}$ may be as follows.

$n'_{SCID}$=(CSI-RS antenna port number)−7

(or $n'_{SCID}$=(CSI-RS antenna port number)−8), or;

$n'_{SCID}$=(CSI-RS configuration number)

(or $n'_{SCID}$=(CSI-RS configuration number)+1)

A sequence for a reference signal may be generated based on the initialization value generation information $n'_{SCID}$, which may be mapped to an RE, and a signal may be generated to be transmitted to one or more UEs. Further, because one or more UEs may be aware of the CSI-RS antenna port and/or the CSI-RS configuration information through another signaling for a CSI-RS, signaled bits may be 0 bits.

More specifically, in the fourth method, in order to generate a reference signal sequence different for one or more UEs or TPs, the CSI-RS antenna port information, or the CSI-RS configuration information having a value of 0 to 31, or the parameter drawn from the CSI-RS antenna port information and/or the CSI-RS configuration information may be used (e.g., $n'_{SCID}$ replaces $n_{SCID}$ in Equation (1)) as the initialization value generation information. However, because one or more UEs may already be aware of this information through another signaling, the initialization value generation information may not be separately signaled to one or more UEs.

As described above, a method according to an exemplary embodiment of the present invention may include: selectively generating one of a reference signal identical, similar, or corresponding for one or more UEs or TPs and a reference signal different for one or more UEs or TPs, and transmitting the generated reference signal to one or more UEs, by a TP; and generating selection instruction information on whether the transmitted reference signal is a reference signal similar or different for one or more UEs or TPs, and transmitting the generated selection instruction information to one or more UEs, by the TP. The described method may be suitable for one or more of the UEs according to a communication environment, such as the CoMP, the MU-MIMO, and the like, Also, the method according to an exemplary embodiment of the present invention may further include generating initialization value generation information capable of changing an initialization value of a sequence for the reference signal, which may be generated to be transmitted, and transmitting the generated initialization value generation information to the relevant UE. Further, the initialization value generation information may include at least one of a common cell ID, RNTI, UE-specific information, TP-specific information, and a parameter related to a CSI-RS, and may be transmitted through high layer signaling, such as RRC.

Further, the initialization value generation information may not be separately signaled to each UE according to the type of a communication system.

Also, the selection instruction information on whether the transmitted reference signal is a reference signal similar or different for one or more UEs or TPs may be implicitly indicated by information included in a DCI format, or may be explicitly indicated by separate bits included in DCI.

When the selection instruction information is implicitly indicated, the selection instruction information may be indicated by 1-bit Scrambling Code Identity ($n_{SCID}$ or SCID) information that may be included in a DCI format 2B, or by information on antenna port(s), a scrambling identity, and the number of layers, which may be included in a DCI format 2C.

Also, when the selection instruction information is explicitly indicated, the selection instruction information may be indicated by a 1-bit additional instruction bit separately added to a DCI format, or may be indicated by at least one of a table of information on antenna port(s), a scrambling identity, and the number of layers, which may be newly formed or defined by 4 bits of the DCI format.

As described above, in an exemplary embodiment of the present invention, a dynamic determination may be made as to which initialization value is to be selected from among the initialization value A and initialization value B according to conditions of one or more UEs, and information (e.g., selection instruction information) related to this determination may be transmitted to one or more UEs. Further, a method for configuring this selection instruction information may include at least one of the following four methods described below. However, aspects of the invention are not limited to thereto.

A method 1 for generating selection instruction information is described in more detail below. The method 1 may be a method in which the existing instruction information related to a DM-RS of Table 2 is used as it is.

The method 1 for generating selection instruction information may use the reference signal instruction information previously defined as in Table 2, and may use the reference signal instruction information for implicit indication.

More specifically, a SCID value, which may be a first value included in information on antenna port(s), and a scrambling identity and a number of layers information, which may be 3-bit information of the DCI format 2C as shown Table 2, may be used for indication. When SCID=0, an initialization value A (i.e., an initialization value for generating identical reference signal sequences) may be generated. When SCID=1, initialization values B (i.e., initialization values for generating different reference signal sequences) may be generated. Further, when SCID=1, the initialization value A (i.e., the initialization value for generating identical reference signal sequences) may be generated. When SCID=0, the initialization values B (i.e., the initialization values for generating different reference signal sequences) may be generated.

When Equation (1) is modified in order to express this configuration of the method 1, Equation (2) below may be obtained. Equation (2) may provide information for transmitting the existing SCID, such as values of Table 2.

$$r(m) = \frac{1}{\sqrt{2}}(1 - 2 \cdot c(2m)) + j\frac{1}{\sqrt{2}}(1 - 2 \cdot c(2m+1)), \quad (2)$$

-continued $$\text{where } m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}, \text{ and}$$

$$c_{init} = (\lfloor n_s/2 \rfloor + 1) \cdot (2N_{ID}^{cell} + 1) \cdot 2^{16} + n_A$$

$$\text{where } n_A = \begin{cases} 0 & \text{if } SCID = 0 \\ n_{RNTI} \text{ or } n'_{SCID} & \text{if } SCID = 1 \end{cases} \text{ or}$$

$$n_A = \begin{cases} n_{RNTI} \text{ or } n'_{SCID} & \text{if } SCID = 0 \\ 0 \text{ or } 1 & \text{if } SCID = 1 \end{cases}$$

Further, in Equation (2), values for determining a sequence initialization value $c_{init}$ include a cell ID $N_{ID}^{cell}$, $n_A$, and the like. As compared with Equation (1), in Equation (2), as include described above, the cell ID $N_{ID}^{cell}$ may become a common cell ID or may be a cell ID of a cell or a TP, to which a UE belongs, as in Equation (1). Also, $n_{SCID}$ as shown in Equation (1) may be replaced by $n_A$ representing initialization value generation information according to an exemplary embodiment of the present invention, and may be differently set according to generation of the initialization value A or the initialization values B according to the existing signaled SCID value.

Further, although $n_A$ may signify a parameter, which may replace $n_{SCID}$ when $n_A$ has the same or similar meaning as the $n_{SCID}$, exemplary embodiments of the present invention may not limited to notation of the scheme as described above. Accordingly, $n_A$ may be denoted in other schemes than the scheme described above. For example, $n_{SCID}$ may be used as an identical or corresponding parameter.

Initialization value generation information may be used to change to the initialization value A identical, similar, or corresponding to one or more UEs or TPs or different initialization value B for one or more UEs or TPs. Further, the initialization value generation information may be used to change to the initialization value A or initialization value B in response to the selection instruction information, which may include at least one of a cell ID $N_{ID}^{cell}$, a common cell ID, RNTI information, separately-defined UE-specific information, separately-defined TP-specific information, and a parameter related to a CSI-RS. When information that one or more UEs may not know exists among them, an eNodeB may transmit the relevant initialization value generation information to the respective UE or UEs through RRC signaling or the like. Further, among the initialization value generation information, the RNTI information may be represented by $n_{RNTI}$, and a value different from $n_{SCID}$, such as the separately-defined UE-specific information, the separately-defined TP-specific information, the parameter related to the CSI-RS or the like, may be represented by $n'_{SCID}$.

A method 2 for generating selection instruction information is described in more detail below. The method 2 may be a method in which the existing instruction information related to a DM-RS of Table 2 is used as it is.

The method 2 for generating selection instruction information may use the reference signal instruction information previously defined as in Table 2, and may use separate explicit instruction bits.

In the method 2, separate 1-bit selection instruction information may be included in a DCI format. More specifically, information added to DCI may not exist in the method 1, whereas 1 bit may be included in the DCI in the method 2. In the case of the method 2, the equation for calculating an initialization value as defined by Equation (1) may be replaced by Equation (3) and Equation (4) below. In each of Equation (3) and Equation (4) below, a formula expressing a reference signal sequence r(m) may be similar or the same as that in Equation (1), and may not be described in more detail.

For reference, Equation (3) may correspond to a situation where the 1-bit information, which may have a value of 0 or 1, additionally included in the DCI format indicate the generation of an initialization value A (i.e., an initialization value for generating identical reference signal sequences). Equation (4) may correspond to a situation where the 1-bit information additionally included in the DCI format indicates the generation of initialization values B, which may be initialization values for generating different reference signal sequences.

$$c_{init} = (\lfloor n_s/2 \rfloor + 1) \cdot (2N_{ID}^{cell} + 1) \cdot 2^{16} + n_{SCID} \quad (3)$$

$$\text{where } n_{SCID} = \begin{cases} 0 & \text{if } SCID = 0 \\ 1 & \text{if } SCID = 1 \end{cases}$$

$$c_{init} = (\lfloor n_s/2 \rfloor + 1) \cdot (2N_{ID}^{cell} + 1) \cdot 2^{16} + n_A \quad (4)$$

where $n_A = n_{RNTI}$ or $n'_{SCID}$ (regardless of whether SCID is 0 or 1)

As compared with Equation (1), in Equation (3) and Equation (4), when the 1-bit information additionally included in the DCI format indicates the generation of the initialization value A or the first initialization value, which may be the initialization value for generating identical reference signal sequences, a cell ID $N_{ID}^{cell}$ may become a common cell ID or may be a cell ID of a cell or a point, to which a UE belongs, as in Equation (1). However, when the 1-bit information additionally included in the DCI format indicates the generation of the initialization values B or the second initialization values, which may be the initialization values for generating different reference signal sequences, the cell ID $N_{ID}^{cell}$ may be the cell ID of the cell or the point, to which the UE belongs, as in Equation (1).

Also, when the 1-bit information additionally included in the DCI format indicates the generation of the initialization value A or the first initialization value (the initialization value for generating identical reference signal sequences), a parameter $n_{SCID}$ among parameters for determining an initialization value as defined by Equation (3) may have a value designated in a similar or the same manner as in Equation (1). When the 1-bit information additionally included in the DCI format indicates the generation of the initialization values B or the second initialization values (the initialization values for generating different reference signal sequences), the parameter $n_{SCID}$ may be replaced by $n_A$. Further, the value of $n_A$ may be at least one of a UE-specific information, TP-specific information, $n_{RNTI}$ representing the value of RNTI, and $n'_{SCID}$.

The $n_A$ may signify a parameter, which may replace $n_{SCID}$. However, when the $n_A$ may have a similar or the same meaning and use as the $n_{SCID}$, aspects of the invention may not be limited to the notation of the scheme as described above. Accordingly, $n_A$ may be denoted in a scheme other than the above scheme. For example, $n_{SCID}$ may be used as an identical or corresponding parameter.

Similarly, in the method 2, initialization value generation information may include at least one of a cell ID $N_{ID}^{cell}$, a common cell ID, RNTI information, separately-defined UE-specific information, separately-defined TP-specific information, and a parameter related to a CSI-RS. When information that one or more UEs may not know exists among them, an eNodeB may transmit the relevant initialization value generation information to one or more UEs through RRC signaling or the like.

A method 3 for generating selection instruction information is described in more detail below. The method 3 may be a mixed method in which instruction information related to a changed DM-RS may be configured instead of Table 2, and additional 1-bit information may be used.

The method 3 for generating selection instruction information may define changed reference signal instruction information differently from the reference signal instruction information defined in Table 2, and may use explicit 1-bit additional information for designating an initialization value, which may be identical, similar, corresponding or different, separately from the changed reference signal instruction information.

More specifically, a definition may be made of a table of 3-bit information on antenna port(s) and the number of layers, which may be a table matched to antenna port(s), a scrambling identity and the number of layers that may be 3-bit information included in the existing DCI format 2C as shown in Table 3 or Table 4 below, but which may not include a SCID. Further, an additional 1-bit for indicating an initialization value A or initialization values B may be separately defined. Accordingly, in the method 3, the selection instruction information may become information having a total of 4 bits.

A conventional scheme as shown in Table 2 may enable MU-MIMO with respect to a total of 4 layers by using an antenna port 7 and an antenna port 8 for the MU-MIMO and by applying SCID values of 0 and 1 to each of the antenna port 7 and the antenna port 8. However, in this situation, quasi-orthogonality, rather than normal orthogonality, may be ensured between antenna ports when SCIDs are different from each other.

Accordingly, it may be more desirable to distinguish between layers of MU-MIMO by using an antenna port without distinguishing between them by using a SCID to ensure normal orthogonality. In this regard, Table 3 or Table 4 below may include a table of information on antenna port(s) and number of layers that may correspond to the method 3.

In a table such as Table 3 or Table 4 below, two additional antenna ports may be used as well as the existing antenna port 7 and antenna port 8. The two additional ports may include, for example, antenna port 9 and antenna port 10, or antenna port 11 and antenna port 13. Accordingly, in the method 3, Table 3 or Table 4 below may be used in place of Table 2. Here, a SCID value is not separately included in DCI.

TABLE 3

| One Codeword: Codeword 0 enabled and Codeword 1 disabled | | Two Codewords: Codeword 0 enabled and Codeword 1 enabled | |
|---|---|---|---|
| Value | Message | Value | Message |
| 0 | 1 layer and port 7 | 0 | 2 layers and ports 7-8 |
| 1 | 1 layer and port 8 | 1 | 2 layers and ports 9-10 |
| 2 | 1 layer and port 8 | 2 | 3 layers and ports 7-9 |
| 3 | 1 layer and-port 10 | 3 | 4 layers and ports 7-10 |
| 4 | 2 layers and ports 7-8 | 4 | 5 layers and ports 7-11 |
| 5 | 3 layers and ports 7-9 | 5 | 6 layers and ports 7-12 |
| 6 | 4 layers and ports 7-10 | 6 | 7 layers and ports 7-13 |
| 7 | Reserved | 7 | 8 layers and ports 7-14 |

TABLE 4

| One Codeword: Codeword 0 enabled and Codeword 1 disabled | | Two Codewords: Codeword 0 enabled and Codeword 1 enabled | |
|---|---|---|---|
| Value | Message | Value | Message |
| 0 | 1 layer and port 7 | 0 | 2 layers and ports 7-8 |
| 1 | 1 layer and port 8 | 1 | 2 layers and ports 11 and 13 |
| 2 | 1 layer and port 11 | 2 | 3 layers and ports 7-9 |
| 3 | 1 layer and port 13 | 3 | 4 layers and ports 7-10 |
| 4 | 2 layers and ports 7-8 | 4 | 5 layers and ports 7-11 |
| 5 | 3 layers and ports 7-9 | 5 | 6 layers and ports 7-12 |
| 6 | 4 layers and ports 7-10 | 6 | 7 layers and ports 7-13 |
| 7 | Reserved | 7 | 8 layers and ports 7-14 |

Accordingly, with respect to Table 3 or Table 4, the equation for calculating an initialization value as defined by Equation (1) may be replaced by Equation (5) or Equation (6) below. In each of Equation (5) and Equation (6) below, a formula expressing a reference signal sequence r(m) may be the same as that in Equation (1), and thus, a further description thereof will be omitted.

More specifically, when the 1-bit information, which may have a value of 0 or, additionally included in the DCI format may indicate the generation of the initialization value A, which may be the initialization value for generating identical reference signal sequences, the initialization value may be calculated by using Equation (5) below.

$$c_{init} = (\lfloor n_s/2 \rfloor + 1) \cdot (2N_{ID}^{cell} + 1) \cdot 2^{16} + n_A$$

where $n_A = 0$ \hfill (5)

Further, when the 1-bit information additionally included in the DCI format indicates the generation of the initialization values B, which may be the initialization values for generating different reference signal sequences, the initialization values may be calculated by using Equation (6) below.

$$c_{init} = (\lfloor n_s/2 \rfloor + 1) \cdot (2N_{ID}^{cell} + 1) \cdot 2^{16} + n_A$$

where $n_A = n_{RNTI}$ or $n'_{SCID}$ \hfill (6)

As compared with Equation (1), in Equation (5) and Equation (6), when the 1-bit information additionally included in the DCI format indicates the generation of the initialization value A, which may be the initialization value for generating identical reference signal sequences, a cell ID $N_{ID}^{cell}$ may become a newly-defined common cell ID or may be a cell ID of a cell or a point, to which a UE belongs, as in Equation (1).

However, when the 1-bit information additionally included in the DCI format indicates the generation of the initialization values B, which may be the initialization values for generating different reference signal sequences, a cell ID of a cell or a point, to which a UE belongs may be used as the cell ID $N_{ID}^{cell}$, as in Equation (1).

Also, when the 1-bit information additionally included in the DCI format indicates the generation of the initialization value A, $n_A$ matched to $n_{SCID}$ as shown in Equation (1) may have a default value, which may have a value of 0 as expressed in Equation (5), but the value of $n_A$ is not limited thereto and may have other values. When the 1-bit information additionally included in the DCI format indicates the generation of the initialization values B, the value of $n_A$ may become a UE-specific value or a TP-specific value, which may include at least one of RNTI information, separately-defined UE-specific information, separately-defined TP-specific information, and a parameter related to a CSI-RS.

In Equation (5) and Equation (6), $n_A$ may signify a parameter that may replace $n_{SCID}$. However, when $n_A$ has a similar or the same meaning and use as the $n_{SCID}$, aspects of the invention may not limited to notation of the scheme as described above. For example, $n_A$ may be denoted in a scheme other than the above scheme, such that $n_{SCID}$ may be used as an identical or corresponding parameter.

Similarly, in the method 3, initialization value generation information for generating the reference signal sequence initialization value A or the reference signal sequence initialization values B, which may respond to the initialization value selection instruction information, may include at least one of a cell ID $N_{ID}^{cell}$, a common cell ID, RNTI information, separately-defined UE-specific information, separately-defined TP-specific information, and a parameter related to a CSI-RS. When information that one or more UEs may not know exists among them, an eNodeB may transmit the relevant initialization value generation information to the respective UE or UEs through RRC signaling or the like.

A method 4 for generating selection instruction information is described in more detail below. The method 4 may be a method in which new 4-bit instruction information related to a DM-RS is defined instead of Table 2.

The method 4 for generating selection instruction information may first define new reference signal instruction information by using a total of 4 bits differently from the reference signal instruction information previously defined as in Table 2. Further, the method 4 may utilize the selection instruction information by using the new reference signal instruction information.

More specifically, a new reference signal instruction information may include at least one of a table of new information on one or more antenna ports, a scrambling identity and the number of layers, which may be a table matched to the one or more antenna ports, and a scrambling identity and the number of layers that are 3-bit information included in the existing DCI format 2C. The new reference signal information may have a total of 4 bits by adding 1 bit. Then, the defined table may be used to implicitly indicate the selection instruction information.

More specifically, at least one of a SCID value, which may be included in 4-bit information on one or more antenna ports, a scrambling identity, and the number of layers, as shown in Table 5 or Table 6 below, may be used for indication. When SCID=0, an initialization value A, which may be an initialization value for generating identical reference signal sequences, may be generated. When SCID=1, initialization values B, which may be an initialization value for generating different reference signal sequences, may be generated. In contrast, when SCID=1, the initialization value A may be generated. When SCID=0, the initialization values B may be generated.

TABLE 5

| One Codeword: Codeword 0 enabled; and Codeword 1 disabled | | Two Codewords: Codeword 0 enabled; and Codeword 1 enabled | |
|---|---|---|---|
| Value | Message | Value | Message |
| 0 | 1 layer, port 7 and SCID = 0 | 0 | 2 layers, ports 7-8 and SCID = 0 |
| 1 | 1 layer, port 7 and SCID = 1 | 1 | 2 layers, ports 7-8 and SCID = 1 |
| 2 | 1 layer, port 8 and SCID = 0 | 2 | 3 layers, ports 7-9 and SCID = 0 |
| 3 | 1 layer, port 8 and SCID = 1 | 3 | 4 layers, ports 7-10 and SCID = 0 |
| 4 | 2 layers, ports 7-8 and SCID = 0 | 4 | 5 layers, ports 7-11 and SCID = 0 |
| 5 | 3 layers, ports 7-9 and SCID = 0 | 5 | 6 layers, ports 7-12 and SCID = 0 |
| 6 | 4 layers, ports 7-10 and SCID = 0 | 6 | 7 layers, ports 7-13 and SCID = 0 |
| 7 | 1 layer, port 9 and SCID = 1 | 7 | 8 layers, ports 7-14 and SCID = 0 |
| 8 | 1 layer, port 10 and SCID = 1 | 8 | 2 layers, ports 9-10 and SCID = 1 |
| 9 | 1 layer, port 11 and SCID = 1 | 9 | 2 layers, ports 11 and 13, and SCID = 1 |
| 10 | 1 layer, port 12 and SCID = 1 | 10 | 2 layers, ports 12 and 14, and SCID = 1 |
| 11 | 1 layer, port 13 and SCID = 1 | 11 | Reserved |
| 12 | 1 layer, port 14 and SCID = 1 | 12 | Reserved |
| 13 | Reserved | 13 | Reserved |
| 14 | Reserved | 14 | Reserved |
| 15 | Reserved | 15 | Reserved |
| or | | | |

| One Codeword: Codeword 0 enabled and Codeword 1 disabled | | Two Codewords: Codeword 0 enabled and Codeword 1 enabled | |
|---|---|---|---|
| Value | Message | Value | Message |
| 0 | 1 layer, port 7 and SCID = 0 | 0 | 2 layers, ports 7-8 and SCID = 0 |
| 1 | 1 layer, port 7 and SCID = 1 | 1 | 2 layers, ports 7-8 and SCID = 1 |
| 2 | 1 layer, port 8 and SCID = 0 | 2 | 2 layers, ports 9-10 and SCID = 1 |
| 3 | 1 layer, port 8 and SCID = 1 | 3 | 2 layers, ports 11 and 13, and SCID = 1 |
| 4 | 1 layer, ports 9 and SCID = 1 | 4 | 2 layers, ports 12 and 14, and SCID = 1 |
| 5 | 1 layer, port 10 and SCID = 1 | 5 | 3 layers, ports 7-9 and SCID = 0 |
| 6 | 1 layer, port 11 and SCID = 1 | 6 | 4 layers, ports 7-10 and SCID = 0 |
| 7 | 1 layer, port 12 and SCID = 1 | 7 | 5 layers, ports 7-11 and SCID = 0 |
| 8 | 1 layer, port 13 and SCID = 1 | 8 | 6 layers, ports 7-12 and SCID = 0 |
| 9 | 1 layer, port 14 and SCID = 1 | 9 | 7 layers, ports 7-13 and SCID = 0 |
| 10 | 2 layers, ports 7-8 and SCID = 0 | 10 | 8 layers, ports 7-14 and SCID = 0 |
| 11 | 3 layers, ports 7-9 and SCID = 0 | 11 | Reserved |
| 12 | 4 layers, ports 7-10 and SCID = 0 | 12 | Reserved |

TABLE 5-continued

| | | | |
|---|---|---|---|
| 13 | Reserved | 13 | Reserved |
| 14 | Reserved | 14 | Reserved |
| 15 | Reserved | 15 | Reserved |

TABLE 6

| One Codeword: Codeword 0 enabled and Codeword 1 disabled | | Two Codewords: Codeword 0 enabled and Codeword 1 enabled | |
|---|---|---|---|
| Value | Message | Value | Message |
| 0 | 1 layer, port 7 and SCID = 0 | 0 | 2 layers, ports 7-8 and SCID = 0 |
| 1 | 1 layer, port 7 and SCID = 1 | 1 | 2 layers, ports 7-8 and SCID = 1 |
| 2 | 1 layer, port 8 and SCID = 0 | 2 | 3 layers, ports 7-9 and SCID = 1 |
| 3 | 1 layer, port 8 and SCID = 1 | 3 | 4 layers, ports 7-10 and SCID = 1 |
| 4 | 2 layers, ports 7-8 and SCID = 1 | 4 | 5 layers, ports 7-11 and SCID = 1 |
| 5 | 3 layers, ports 7-9 and SCID = 1 | 5 | 6 layers, ports 7-12 and SCID = 1 |
| 6 | 4 layers, ports 7-10 and SCID = 1 | 6 | 7 layers, ports 7-13 and SCID = 1 |
| 7 | 1 layer, port 9 and SCID = 0 | 7 | 8 layers, ports 7-14 and SCID = 1 |
| 8 | 1 layer, port 10 and SCID = 0 | 8 | 2 layers, ports 9-10 and SCID = 0 |
| 9 | 1 layer, port 11 and SCID = 0 | 9 | 2 layers, ports 11 and 13, and SCID = 0 |
| 10 | 1 layer, port 12 and SCID = 0 | 10 | 2 layers, ports 12 and 14, and SCID = 0 |
| 11 | 1 layer, port 13 and SCID = 0 | 11 | Reserved |
| 12 | 1 layer, port 14 and SCID = 0 | 12 | Reserved |
| 13 | Reserved | 13 | Reserved |
| 14 | Reserved | 14 | Reserved |
| 15 | Reserved | 15 | Reserved | or

| One Codeword: Codeword 0 enabled and Codeword 1 disabled | | Two Codewords: Codeword 0 enabled and Codeword 1 enabled | |
|---|---|---|---|
| Value | Message | Value | Message |
| 0 | 1 layer, port 7 and SCID = 0 | 0 | 2 layers, ports 7-8 and SCID = 0 |
| 1 | 1 layer, port 7 and SCID = 1 | 1 | 2 layers, ports 7-8 and SCID = 1 |
| 2 | 1 layer, port 8 and SCID = 0 | 2 | 2 layers, ports 9-10 and SCID = 0 |
| 3 | 1 layer, port 8 and SCID = 1 | 3 | 2 layers, ports 11 and 13, and SCID = 0 |
| 4 | 1 layer, port 9 and SCID = 0 | 4 | 2 layers, ports 12 and 14, and SCID = 0 |
| 5 | 1 layer, port 10 and SCID = 0 | 5 | 3 layers, ports 7-9 and SCID = 1 |
| 6 | 1 layer, port 11 and SCID = 0 | 6 | 4 layers, ports 7-10 and SCID = 1 |
| 7 | 1 layer, port 12 and SCID = 0 | 7 | 5 layers, ports 7-11 and SCID = 1 |
| 8 | 1 layer, port 13 and SCID = 0 | 8 | 6 layers, ports 7-12 and SCID = 1 |
| 9 | 1 layer, port 14 and SCID = 0 | 9 | 7 layers, ports 7-13 and SCID = 1 |
| 10 | 2 layers, ports 7-8 and SCID = 1 | 10 | 8 layers, ports 7-14 and SCID = 1 |
| 11 | 3 layers, port 7-9 and SCID = 1 | 11 | Reserved |
| 12 | 4 layers, ports 7-10 and SCID = 1 | 12 | Reserved |
| 13 | Reserved | 13 | Reserved |
| 14 | Reserved | 14 | Reserved |
| 15 | Reserved | 15 | Reserved |

According to the method 4, the equation for calculating an initialization value as defined by Equation (1) may be replaced by Equation (7) or Equation (8) below. In each of Equation (7) and Equation (8) below, a formula expressing a reference signal sequence r(m) may be the same as that in Equation (1), and thus, a further description thereof may be omitted.

$$c_{init} = (\lfloor n_g/2 \rfloor + 1) \cdot (2N_{ID}^{cell} + 1) \cdot 2^{16} + n_A \quad (7)$$

$$\text{where } n_A = \begin{cases} n_{RNTI} \text{ or } n'_{SCID} & \text{if } SCID = 0 \\ 0 \text{ or } 1 & \text{if } SCID = 1 \end{cases}$$

$$c_{init} = (\lfloor n_g/2 \rfloor + 1) \cdot (2N_{ID}^{cell} + 1) \cdot 2^{16} + n_A \quad (8)$$

$$\text{where } n_A = \begin{cases} 0 & \text{if } SCID = 0 \\ n_{RNTI} \text{ or } n'_{SCID} & \text{if } SCID = 1 \end{cases}$$

More specifically, as compared with a situation in which a DCI format in an existing Release 10 (Rel-10), the method 1 may identically have 3 bits as signaling bits. The method 2 and the method 3 may correspond to the situation of adding 1 bit to the 3 bits. The method 4 may provide more flexibility in selecting an orthogonal port of a DM-RS by modifying the method 2 and the method 3.

Table 5 and Table 6 may include information associated with various environments or situations. In these environments or situations, an orthogonal port of a DM-RS may be selected. According to aspects of the invention, a total of 8 orthogonal ports may be used for MU-MIMO. However, the number of reserved rows may be increased to delete one or more rows in Table 5 and Table 6 according to circumstances.

Figure 4:
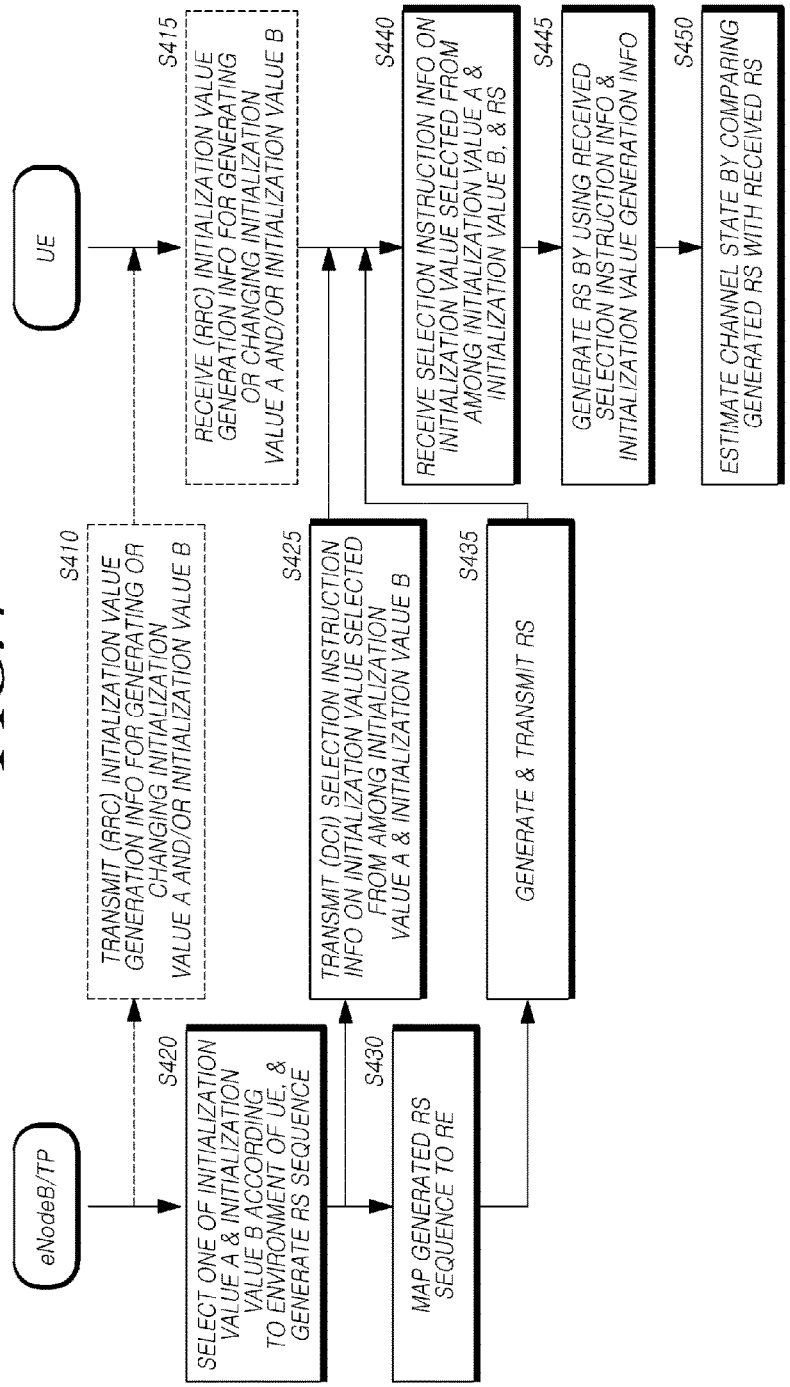
FIG. 4 is a flowchart illustrating a method for transmitting a reference signal according to an exemplary embodiment of the present invention.

FIG. 4 is a flowchart illustrating a method for transmitting a reference signal according to an exemplary embodiment of the present invention.

In generating a reference signal to be transmitted to an UE, in view of a communication environment of a particular UE, a TP may select, as a reference signal, at least one of an initialization value A (or a first initialization value) of a reference signal sequence identical for each UE or TP, and an initialization value B (or a second initialization value) of a reference signal sequence different for one or more UEs or TPs. Further, the TP may generate a reference signal sequence based on the relevant or selected initialization value (S420).

The eNodeB and/or the TP may generate selection instruction information corresponding to information on an initialization value selected from among the first initialization value and the second initialization value, and transmit the generated selection instruction information to the UE in the form of a DCI format or the like (S425). As described above, the selection instruction information may be implicitly indicated by at least one of the information on one or more antenna ports, a scrambling identity, and the number of layers that has 3 bits included in the DCI format 2C, or by at least one of a newly defined 4-bit information on the one or more antenna ports, a scrambling identity, and the number of layers. Further, the selection instruction information may be separately generated by additionally using one or more explicit instruction bits.

Also, the TP maps the reference signal sequence generated in operation S420 to an RE (S430), and generates a reference signal for transmitting to the relevant UE (S435).

Further, the UE receives, from the eNodeB and/or the TP, both the selection instruction information, which corresponds to information on an initialization value selected from among the first initialization value and the second initialization value, and the relevant reference signal, which has been generated according to the selection instruction information (S440).

Also, the method of FIG. 4 may additionally include operation S410 and operation S415 as an option. In operation S410, the TP transmits initialization value generation information to generate or change the initialization value A and/or the initialization value B to the relevant UE. The initialization value generation information may include at least one of a cell ID $N_{ID}^{cell}$, a common cell ID, RNTI information, separately-defined UE-specific information, separately-defined TP-specific information, and a parameter related to a CSI-RS. However, aspects of the invention are not limited thereto.

When the TP transmits the initialization value generation information to the UE, high layer signaling, such as RRC, may be used. However, aspects of the invention are not limited thereto.

The UE may receive the initialization value generation information transmitted by the TP (S415).

Further, the UE may be aware of at least one of the RNTI information, a cell ID of a cell or a point to which the UE belongs, and information related to a CSI-RS, among the initialization value generation information necessary to generate or change the initialization value A and/or the initialization value B. Accordingly, the TP may not have to separately transmit this initialization value generation information to the UE. In such a situation, operation S410 and operation S415 may be omitted.

A determination to which information is to be used among the initialization value generation information, may be made according to an environment of a communication system. The environment of the communication system may include at least one of the types of CoMP scenario, a CoMP scheme, and a determination of whether MU-MIMO is supported.

The UE which receives, from the TP, the selection instruction information of one of the initialization value A of identical reference signal sequences or the initialization value B of different reference signal sequence, generates a reference signal in a scheme indicated by the selection instruction information by using the initialization value generation information that the UE has received or is already aware of (S445). The initialization value generation information may be received in advance by the UE.

Further, the UE estimates a channel by comparing the reference signal generated in step S445 with the reference signal received from the TP in step S440 (S450).

Therefore, in the communication system supporting CoMP and/or MU-MIMO and the like, the TP may transmit, to the UE, the reference signal identical, similar, corresponding, or different for one or more UEs or TPs according to the environment of the UE, and may enable the UE to estimate a channel.

Figure 5:
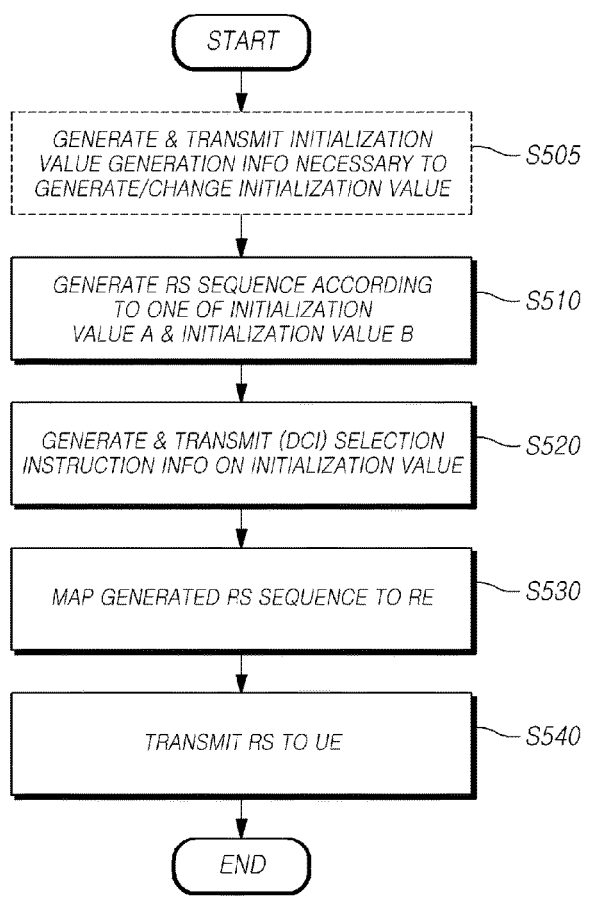
FIG. 5 is a flowchart showing a method for transmitting a reference signal by a TP according to an exemplary embodiment of the present invention.

FIG. 5 is a flowchart showing a method for transmitting a reference signal by a TP according to an exemplary embodiment of the present invention.

In FIG. 5, a subject that transmits a reference signal may be referred to as a TP. A subject that transmits instruction information related to the generation of a reference signal may be referred to as an eNodeB and/or a TP, which receives the instruction information from the eNodeB. Accordingly, a method and an apparatus in the eNodeB may be distinguished from those in the TP. However, the eNodeB may also correspond to a TP. Accordingly, a method and an apparatus in the eNodeB may be integrated into those in the TP.

In generating a reference signal to be transmitted to one or more UEs, in view of a communication environment of a particular UE, the TP may select one of an initialization value A of a reference signal sequence identical for one or more UEs or TPs and an initialization value B of a reference signal sequence different for each UE or TP, and generates a reference signal sequence based on the relevant initialization value (S510).

Further, the TP generates selection instruction information corresponding to information on an initialization value selected from among the first initialization value and the second initialization value, and transmits the generated selection instruction information to the UE in the form of a DCI format or the like (S520).

The selection instruction information according to an exemplary embodiment of the present invention may be implicitly indicated by at least one of the information on one or more antenna ports, a scrambling identity, and the number of layers that has 3 bits included in the existing DCI format 2C, or by at least one of the newly defined 4-bit information on one or more antenna ports, a scrambling identity, and the number of layers. Otherwise, a DCI format may include a 1-bit instruction bit, which may be separately defined together with the instruction information related to the DM-RS as described above, and the selection instruction information may be explicitly indicated by the 1-bit instruction bit.

In operation S530, the TP maps the reference signal sequence generated in step S520 to an RE. In operation S540, the TP generates a reference signal and transmits the generated reference signal to the relevant UE.

Also, before performing step S510, the method may additionally include step S505 in which the TP generates initialization value generation information to generate or change the first initialization value or the second initialization value, and transmits the generated initialization value generation information to the relevant UE. The initialization value generation information may include at least one of a cell ID $N_{ID}^{cell}$, a common cell ID, RNTI information, separately-defined UE-specific information, separately-defined TP-specific information, and a parameter related to a CSI-RS. However, aspects of the invention are not limited thereto.

When the TP transmits the initialization value generation information to the UE, high layer signaling such as RRC may be used. However, aspects of the invention are not limited thereto.

Further, the UE may know or be aware of at least one of the RNTI information, a cell ID of a cell or a point to which the UE belongs, and information related to a CSI-RS, among the initialization value generation information that may be used to generate or change the initialization value A and/or the initialization value B. Accordingly, the TP may not separately transmit the initialization value generation information to the UE. In such a situation or environment, step S505 may be omitted.

Figure 6:
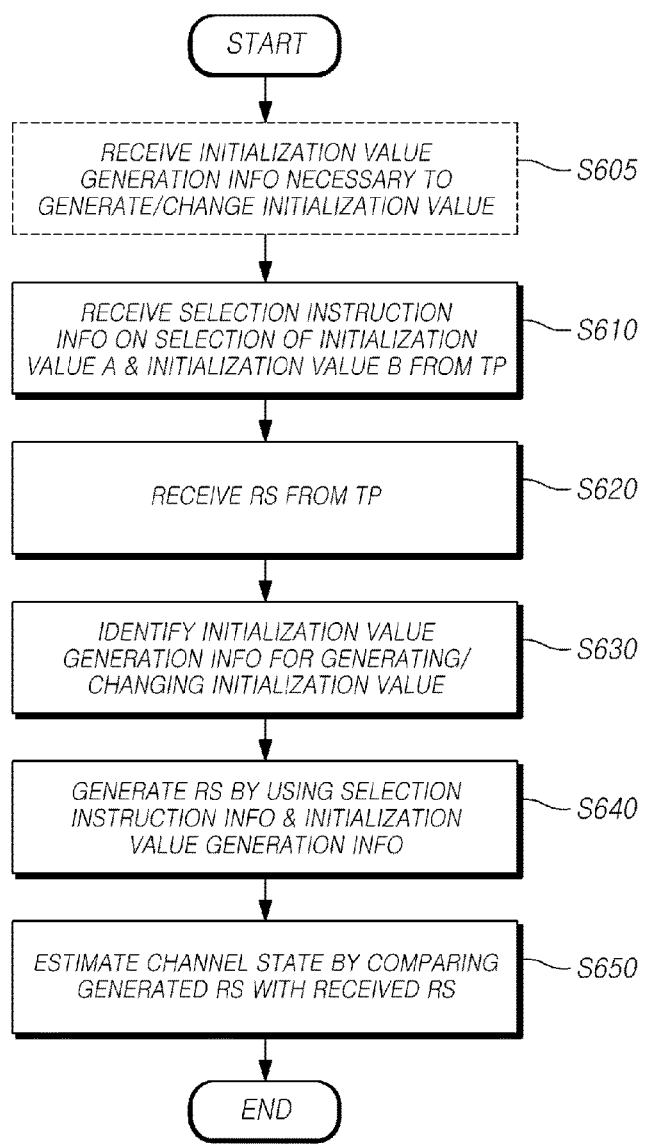
FIG. 6 is a flowchart showing a method for estimating a channel by a mobile station according to an exemplary embodiment of the present invention.

FIG. 6 is a flowchart showing a method for estimating a channel by a mobile station according to an exemplary embodiment of the present invention.

In operation S610, a UE receives selection instruction information on an initialization value of a reference signal sequence, which may be transmitted by a TP, such as an eNodeB.

The selection instruction information may refer to information indicating that an initialization value of a sequence for a reference signal, which is to be transmitted by the TP, is either an initialization value A of a reference signal sequence identical for one or more UEs or TPs, or an initialization value B of a reference signal sequence different for one or more UEs or TPs. The selection instruction information may be transmitted in the DCI format.

As described above, the selection instruction information may be implicitly indicated by at least one of the information on one or more antenna ports, a scrambling identity, and the number of layers that has 3 bits included in the DCI format 2C, or by at least one of the newly defined 4-bit information on one or more antenna ports, a scrambling identity, and the number of layers. Otherwise, the selection instruction information may separately be generated by additionally using one explicit instruction bit. Also, the UE receives a reference signal that the TP generates and transmits according to the selection instruction information (S620).

In operation S630, the UE identifies initialization value generation information for generating a reference signal sequence. In operation S640, the UE generates a reference signal in a scheme indicated by the selection instruction information by using the identified initialization value generation information.

In operation S650, the UE estimates a channel by comparing the reference signal generated in step S640 with the reference signal received from the TP in operation S620.

Further, the method may additionally include operation S605 in which the UE receives initialization value generation information used to generate or change the first initialization value or the second initialization values from the TP through RRC or the like. The initialization value generation information may include at least one of a cell ID, a common cell ID, RNTI information, separately-defined UE-specific information, separately-defined TP-specific information, and a parameter related to a CSI-RS. However, aspects of the invention are not limited thereto.

Further, the UE may know or be aware of at least one of the RNTI information, a cell ID of a cell or a point to which the UE belongs, and information related to a CSI-RS, among the initialization value generation information used to generate or change the first initialization value or the second initialization value. Accordingly, the TP may not separately transmit this initialization value generation information to the UE. In such a situation, operation S605 may be omitted.

Figure 7:
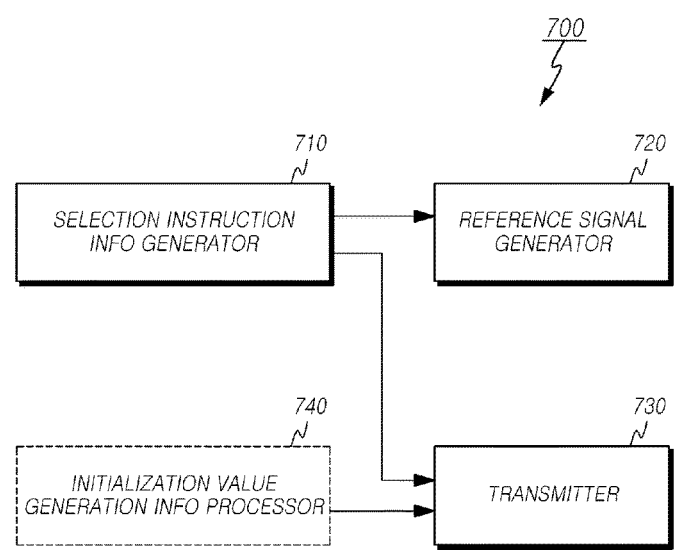
FIG. 7 is a block diagram illustrating a configuration of an apparatus to generate and transmit a reference signal and information related to the generation of the reference signal according to an exemplary embodiment of the present invention.

FIG. 7 is a block diagram illustrating a configuration of an apparatus to generate and transmit a reference signal and information related to the generation of the reference signal according to an exemplary embodiment of the present invention.

The apparatus to generate and transmit a reference signal and information related to the generation of the reference signal according to exemplary embodiments of the present invention may be implemented within the eNodeB and/or the TP or as a part of the eNodeB and/or the TP. However, aspects of the invention are not limited thereto.

The apparatus 700 to generate and transmit a reference signal and information related to the generation of the reference signal according to exemplary embodiments of the present invention includes: a selection instruction information generator 710 to generate selection instruction information on an initialization value of a reference signal sequence; a reference signal generator 720 to generate a downlink reference signal according to a determined scheme; and a transmitter 730 to transmit at least one of the selection instruction information and the generated reference signal to one or more UEs. Selectively, the apparatus 700 may additionally include an initialization value generation information processor 740 to generate initialization value generation information used to change or generate the initialization value of the reference signal sequence and transmit the generated initialization value generation information to one or more UEs.

In generating a reference signal to be transmitted to one or more UEs, in view of a communication environment of a particular UE, the selection instruction information generator 710 may generate selection instruction information indicating one of an initialization value A (or a first initialization value) of a reference signal sequence identical, similar, or corresponding for each UE or TP, or one or more UEs or TPs, and an initialization value B (or a second initialization value) of a reference signal sequence different for each UE or TP, or one or more UEs or TPs.

As described above in relation to Equation (2), Equation (3), Equation (4), Equation (5), Equation (6), Equation (7), and Equation (8), the selection instruction information may be implicitly indicated by at least one of the information on one or more antenna ports, a scrambling identity, and the number of layers that has 3 bits included in the DCI format 2C, or by at least one of the newly-defined 4-bit information on one or more antenna ports, a scrambling identity, and the number of layers. Otherwise, a DCI format may separately include a 1-bit instruction bit, and the selection instruction information may be explicitly indicated by the 1-bit instruction bit.

The generated selection instruction information may be transmitted to the UE by the transmitter 730 in the form of a DCI format or the like.

The reference signal generator 720 may generate a downlink reference signal in a scheme matched or corresponding to the selection instruction information transmitted to the UE. Further, according to the initialization value A or the initialization values B, reference signals identical, similar, corresponding, or different according to the UEs or TPs may be generated.

Also, the initialization value generation information processor 740 may generate initialization value generation information that may be used to generate or change the first initialization value or the second initialization value, which may include at least one of a cell ID, a common cell ID, RNTI information, separately-defined UE-specific information, separately-defined TP-specific information and a parameter related to a CSI-RS. Further, the initialization value generation information processor 740 may transmit the generated initialization value generation information to the UE through RRC signaling by using the transmitter.

Figure 8:
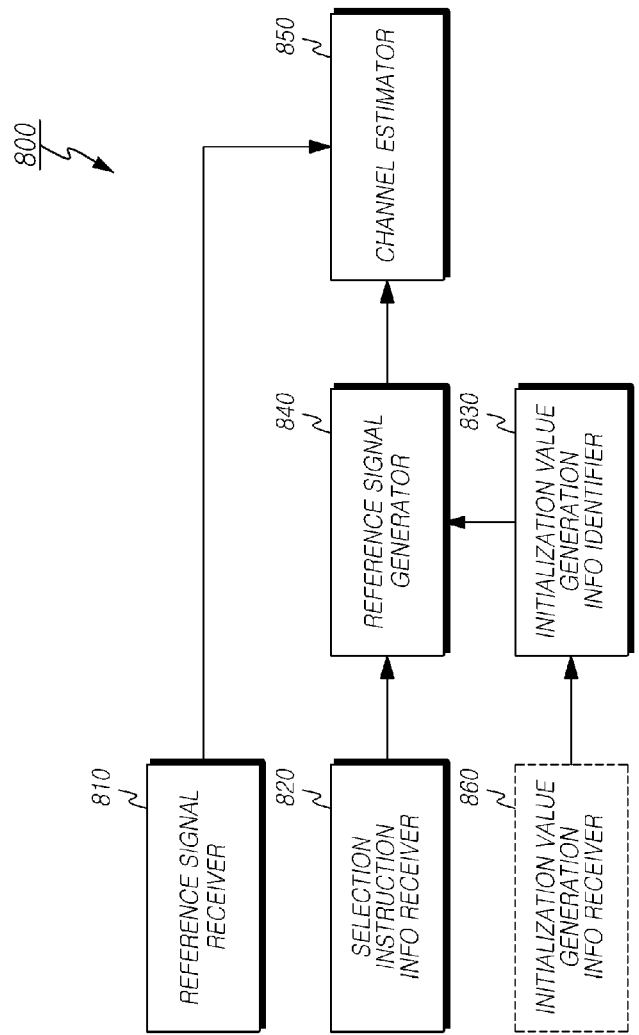
FIG. 8 is a block diagram illustrating a configuration of an apparatus to estimate a channel according to an exemplary embodiment of the present invention.

FIG. 8 is a block diagram illustrating a configuration of an apparatus to estimate a channel according to an exemplary embodiment of the present invention.

The apparatus to estimate a channel according to an exemplary embodiment of the present invention may be implemented within the UE or as a part of the UE. However, aspects of the invention are not limited thereto.

The apparatus 800 to estimate a channel according to an exemplary embodiment of the present invention may include: a reference signal receiver 810 to receive a reference signal from the TP; a selection instruction information receiver 820 to receive, from the TP, selection instruction information corresponding to information on an initialization value of a reference signal; an initialization value generation information identifier 830 to identify initialization value generation information used to generate or change the initialization value used to generate the reference signal; a reference signal generator 840 to generate a reference signal based on the received selection instruction information and the identified initialization value generation information; and a channel estimator 850 to estimate a channel state by comparing the generated reference signal with the received reference signal. Also, selectively, the apparatus 800 may additionally include an initialization value generation information receiver 860 to receive, from the TP, initialization value generation information used to change or generate an initialization value of a reference signal sequence.

The reference signal receiver 810 may receive a reference signal transmitted by the TP. Further, the received reference signal may be a reference signal, which may be generated according to selection instruction information and transmitted. The selection instruction information may indicate that an initialization value of a sequence for the reference signal transmitted by the TP may be an initialization value A (or a first initialization value) of a reference signal sequence, or an initialization value B (or a second initialization value) of a reference signal sequence. The initialization value A of the reference signal sequence may be identical, similar, or corresponding to each UE or TP (or one or more UEs or TPs). The initialization value B of the reference signal sequence may be different for each UE or TP (or one or more UEs or TPs).

The selection instruction information may refer to information, which may be explicitly or implicitly known by the UE. The TP may generate the selection instruction information according to the scheme as shown in Equation (2), Equation (3), Equation (4), Equation (5), Equation (6), Equation (7), and Equation (8). Further, the TP may transmit the generated selection instruction information to the UE. Further, the selection instruction information receiver 820 may receive the selection instruction information.

The initialization value generation information identifier 830 may identify initialization value generation information that may be used to generate or change an initialization value used when the UE generates a reference signal. The initialization value generation information may include at least one of a cell ID of a cell or a point to which the UE may belong, a common cell ID, RNTI information, separately-defined UE-specific information, separately-defined TP-specific information, and a parameter related to a CSI-RS. However, aspects of the invention are not limited thereto. Also, the UE may know or be aware of the initialization value generation information. However, according to circumstances, the initialization value generation information receiver 860 may receive the initialization value generation information from the TP, and the UE may detect it.

The reference signal generator 840 may generate a reference signal in a scheme matched or corresponding to the received selection instruction information by using the identified or received initialization value generation information.

The channel estimator 850 may compare the reference signal generated by the reference signal generator 840 with the reference signal received by the reference signal receiver 810, and may estimate a channel state as a result of the comparison.

According to exemplary embodiments of the present invention as described above, when generating a downlink reference signal to be transmitted to one or more UEs in the communication system supporting CoMP and/or MU-MIMO and the like, according to an environment of each UE, an initialization value A of a reference signal sequence identical for each UE or TP and an initialization value B of a reference signal sequence different for each UE or TP may be selected, and a reference signal may be generated based on the selected initialization value. Accordingly, aspects of the invention may allow one or more UEs to estimate a channel.

Also, the type of reference signal initialization value A or reference signal initialization value B may dynamically be indicated to one or more UEs. Accordingly, exemplary embodiments of the present invention may provide such an effect that the orthogonality of downlink reference signals and/or the pseudo orthogonality thereof can be maintained or improved in a communication environment of CoMP or MIMO.

Although the components of an apparatus according to exemplary embodiments of the present invention are coupled as a single unit or coupled to be operated as a single unit, aspects of the invention are not limited thereto. For example, one or more components among the components may be selectively coupled to be operated as one or more units. Also, although one or more of the components may be implemented as an independent hardware, some or all of the components may be selectively combined with each other, so that they may be implemented as a computer program having one or more program modules to perform some or all of the operations combined in one or more hardwares. Codes and code segments forming the computer program may be conceived by an ordinarily skilled person in the relevant technical field. Such a computer program may implement the exemplary embodiments of the present invention by being stored in a non-transitory computer-readable medium, and being read and executed by the computer with a processor. Storage mediums to store computer program may include a magnetic recording medium, an optical recording medium, a carrier wave medium, and the like.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for transmitting a reference signal, comprising:
   configuring first initialization value generation information associated with a first value of scrambling code identity (SCID) ($n_{SCID}$) information and second initialization value generation information associated with a second value of the SCID ($n_{SCID}$) information, wherein the first initialization value generation information and the second initialization value generation information comprise respective cell identity (cell ID) information, wherein the respective cell ID information is selected based on the SCID ($n_{SCID}$) information;
   transmitting, to a user equipment (UE), the first initialization value generation information and the second initialization value generation information through a higher layer signaling;
   transmitting, to the UE, the SCID ($n_{SCID}$) information as selection indication information;
   generating a reference signal for the UE based on one of a first initialization value and a second initialization value selected by the SCID ($n_{SCID}$) information, the first initialization value being determined based on the first initialization value generation information and the second initialization value being determined based on the second initialization value generation information; and
   transmitting the generated reference signal to the UE.

2. The method of claim 1, wherein the higher layer signaling corresponds to a radio resource control (RRC) signaling.

3. The method of claim 1, wherein the SCID ($n_{SCID}$) information is included in downlink control information (DCI).

4. The method of claim 1, wherein the SCID ($n_{SCID}$) information corresponds to a SCID value included in 3-bit information representing antenna port(s), a scrambling identity, and a number of layers.

5. A method of operating a user equipment (UE), comprising:
   receiving, from a base station (BS), a first reference signal;
   receiving first initialization value generation information associated with a first value of scrambling code identity (SCID) ($n_{SCID}$) information and second initialization value generation information associated with a second value of the SCID ($n_{SCID}$) information through a higher layer signaling, wherein the first initialization value generation information and the second initialization value generation information comprise respective cell identity (cell ID) information, wherein the respective cell ID information is selected based on the SCID ($n_{SCID}$) information;
   receiving the SCID ($n_{SCID}$) information as selection indication information;
   generating a second reference signal based on one of a first initialization value and a second initialization value indicated by the SCID ($n_{SCID}$) information, the first initialization value being determined based on the first initialization value generation information and the second initialization value being determined based on the second initialization value generation information; and
   estimating a channel state by comparing the second reference signal with the first reference signal.

6. The method of claim 5, wherein the higher layer signaling corresponds to a radio resource control (RRC) signaling.

7. The method of claim 5, wherein the SCID ($n_{SCID}$) information is included in downlink control information (DCI).

8. The method of claim 5, wherein the SCID ($n_{SCID}$) information corresponds to a SCID value included in 3-bit information representing antenna port(s), a scrambling identity, and a number of layers.

9. A user equipment (UE) configured for receiving a reference signal, comprising:
   one or more receivers;
   a processor coupled to the one or more receivers, wherein the processor is configured to cause the UE to:
      receive a first reference signal generated for the UE;
      receive first initialization value generation information associated with a first value of scrambling code identity (SCID) ($n_{SCID}$) information and second initialization value generation information associated with a second value of the SCID ($n_{SCID}$) information through a higher layer signaling, wherein the first initialization value generation information and the second initialization value generation information comprise respective cell identity (cell ID) information, wherein the respective cell ID information is selected based on the SCID ($n_{SCID}$) information;
      receive the SCID ($n_{SCID}$) information as selection indication information;
      generate a second reference signal based on one of a first initialization value and a second initialization value indicated by the SCID ($n_{SCID}$) information, the first initialization value being determined based on the first initialization value generation information and the second initialization value being determined based on the second initialization value generation information; and
      estimate a channel state by comparing the second reference signal with the first reference signal.

10. The UE of claim 9, wherein the higher layer signaling corresponds to a radio resource control (RRC) signaling.

11. The UE of claim 9, wherein the SCID ($n_{SCID}$) information is included in downlink control information (DCI).

12. The UE of claim 9, wherein the SCID ($n_{SCID}$) information corresponds to a SCID value included in 3-bit information representing antenna port(s), a scrambling identity, and a number of layers.

13. The method of claim 1, wherein at least one of the first initialization value generation information and the second initialization value generation information comprise a parameter related to a channel state information reference signal (CSI-RS).

14. The method of claim 3, wherein the DCI is in DCI format 2C.

15. The method of claim 5, wherein at least one of the first initialization value generation information and the second initialization value generation information comprise a parameter related to a channel state information reference signal (CSI-RS).

16. The method of claim 7, wherein the DCI is in DCI format 2C.

17. The UE of claim 9, wherein at least one of the first initialization value generation information and the second initialization value generation information comprise a parameter related to a channel state information reference signal (CSI-RS).

18. The UE of claim 11, wherein the DCI is in DCI format 2C.

* * * * *